US007193454B1

(12) United States Patent
Marinca

(10) Patent No.: US 7,193,454 B1
(45) Date of Patent: Mar. 20, 2007

(54) METHOD AND A CIRCUIT FOR PRODUCING A PTAT VOLTAGE, AND A METHOD AND A CIRCUIT FOR PRODUCING A BANDGAP VOLTAGE REFERENCE

(75) Inventor: Stefan Marinca, Limerick (IE)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 10/887,057

(22) Filed: Jul. 8, 2004

(51) Int. Cl.
*G06F 1/10* (2006.01)

(52) U.S. Cl. ........................ 327/539; 327/538; 327/541

(58) Field of Classification Search ........ 327/538–541, 327/543, 544; 323/313
See application file for complete search history.

(56) References Cited

U.S. PATENT DOCUMENTS 4,380,706 A * 4/1983 Wrathall ..................... 327/539

(Continued)

OTHER PUBLICATIONS

Brokaw, A. Paul, "A simple three-terminal IC bandgap reference", IEEE Journal of Solid-State Circuits, vol. SC-9, No. 6, Dec. 1974, pp. 388-393.

(Continued)

*Primary Examiner*—Dinh T. Le
(74) *Attorney, Agent, or Firm*—Wolf, Greenfield & Sacks P.C.

(57) ABSTRACT

A bandgap voltage reference circuit (1) produces a bandgap voltage reference ($V_{ref}$) on an output terminal (3) relative to a common ground voltage terminal (4). The circuit (1) develops a PTAT voltage across a primary resistor (r3) which is reflected and gained up across an output resistor (r4) and summed with a CTAT voltage to produce the voltage reference ($V_{ref}$). A first circuit comprising a PTAT voltage cell (15) having first and second transistor stacks of first and second transistors (Q1,Q2) and (Q3,Q4) operated at different current densities develops a PTAT ($2\Delta V_{be}$) across a first resistor (r1). The PTAT voltage developed across the first resistor (r1) is applied to an inverting input of a first op-amp (A1), the output of which is coupled to a first end (9) of the primary resistor (r3). A first voltage level relative to the ground terminal (4) is applied to the first end (9) of the primary resistor (r3) through a feedback loop of the first op-amp (A1) having a second resistor (r2) and a third transistor (Q5), similar to the first transistors (Q1,Q2). A second end (11) of the primary resistor (r3) is held at a second voltage level of one first base-emitter voltage relative to the ground terminal (4) by a second op-amp (A2) so that a PTAT voltage is developed across the primary resistor (r3) by the difference of the first voltage level and the second voltage level. The PTAT voltage developed across the primary resistor (r3) is reflected and gained up across the output resistor (r4) in a negative feedback loop (20) of the second op-amp (A2) and is summed with the first base-emitter voltage derived from the first transistor (Q2) to produce the bandgap voltage reference ($V_{ref}$) on the output terminal 3, which is given by the equation:

$$V_{ref} = V_{be}(1) + 2\Delta V_{be}\left(1 + \frac{r2}{r1}\right)\frac{r4}{r3}$$

FIG. 5 to accompany the abstract.

52 Claims, 7 Drawing Sheets

U.S. PATENT DOCUMENTS

| | | | | |
|---|---|---|---|---|
| 4,603,291 | A | 7/1986 | Nelson | |
| 4,808,908 | A | 2/1989 | Lewis et al. | |
| 4,939,442 | A | 7/1990 | Carvajal et al. | |
| 5,053,640 | A | 10/1991 | Yum | |
| 5,325,045 | A * | 6/1994 | Sundby | 323/313 |
| 5,352,973 | A | 10/1994 | Audy | |
| 5,424,628 | A | 6/1995 | Nguyen | |
| 5,512,817 | A | 4/1996 | Nagaraj | |
| 5,933,045 | A | 8/1999 | Audy et al. | |
| 5,982,201 | A | 11/1999 | Brokaw et al. | |
| 6,157,245 | A | 12/2000 | Rincon-Mora | |
| 6,218,822 | B1 | 4/2001 | MacQuigg | |
| 6,242,898 | B1 * | 6/2001 | Shimizu et al. | 323/313 |
| 6,329,868 | B1 | 12/2001 | Furman | |
| 6,362,612 | B1 * | 3/2002 | Harris | 323/312 |
| 6,373,330 | B1 | 4/2002 | Holloway | |
| 6,426,669 | B1 | 7/2002 | Friedman et al. | |
| 6,528,979 | B2 * | 3/2003 | Kimura | 323/313 |
| 6,529,066 | B1 * | 3/2003 | Guenot et al. | 327/539 |
| 6,614,209 | B1 * | 9/2003 | Gregoire, Jr. | 323/316 |
| 6,788,041 | B2 * | 9/2004 | Gheorghe et al. | 323/313 |
| 6,885,178 | B2 * | 4/2005 | Marinca | 323/316 |
| 6,891,358 | B2 * | 5/2005 | Marinca | 323/316 |
| 2003/0107361 | A1 * | 6/2003 | Goetz et al. | 323/313 |
| 2005/0001605 | A1 * | 1/2005 | Marinca | 323/314 |
| 2005/0218879 | A1 * | 10/2005 | Garlapati et al. | 323/313 |

OTHER PUBLICATIONS

Widlar, Robert J., "New developments in IC voltage regulators", IEEE Journal of Solid-State Circuits, vol. SC-6, No. 1, Feb. 1971, pp. 2-7.

Jones, D.A., and Martin, K., "Analog Integrated Circuit Design", John Wiley & Sons, USA, 1997 (ISBN 0-47L-L4448-7, pp. 353-363).

Banba et al, "A CMOS bandgap reference circuit with Sub-1-V operation", IEEE JSSC vol. 34, No. 5, May 1999, pp. 670-674.

Malcovati et al, "Curvature-compensated BiCMOS bandgap with 1-V supply voltage", IEEE JSSC, vol. 36, No. 7, Jul. 2001.

Sudha et al, "A low noise sub-bandgap voltage reference", IEEE, Proceedings of the 40th Midwest Symposium on Circuits and Systems, 1997, vol. 1, Aug. 3-6, 1997, pp. 193-196.

* cited by examiner

METHOD AND A CIRCUIT FOR PRODUCING A PTAT VOLTAGE, AND A METHOD AND A CIRCUIT FOR PRODUCING A BANDGAP VOLTAGE REFERENCE

FIELD OF THE INVENTION

The present invention relates to a PTAT voltage generating circuit for producing a PTAT voltage, and the invention also relates to a method for producing a PTAT voltage. The invention further relates to a bandgap voltage reference circuit for producing a bandgap voltage reference, and to a method for producing a bandgap voltage reference. In particular, the invention relates to a PTAT voltage generating circuit and to a method for generating a PTAT voltage, which is suitable for operating in relatively low supply voltage environments, and in which the effect of op-amp voltage offsets is minimised. Additionally, the invention relates to a bandgap voltage reference circuit and a method for producing a bandgap voltage reference which is suitable for operating in relatively low supply voltage environments, and in which the effect of op-amp voltage offsets in the bandgap voltage reference is minimised.

BACKGROUND TO THE INVENTION

Bandgap voltage reference circuits operate on the principle of adding two voltages having equal and opposite temperature coefficients to produce a bandgap voltage reference. This is typically achieved by adding the base-emitter junction voltage of a forward biased transistor which is complementary to absolute temperature (CTAT), and thus decreases with absolute temperature, to a voltage which is proportional to absolute temperature (PTAT), and thus increases with absolute temperature. Typically, the PTAT voltage is developed by amplifying the voltage difference of the base-emitter voltages of two forward biased transistors operating at different current densities.

In FIG. 1 a typical prior art CMOS bandgap voltage reference circuit is illustrated. A CTAT voltage is derived from the base-emitter voltage of a first substrate bipolar transistor Q1, the temperature dependent base-emitter voltage of which is given by the following equation:

$$V_{be}(Q1) = V_{G0}\left(1 - \frac{T}{T_0}\right) + V_{be}(T_0)\frac{T}{T_0} - \sigma\frac{KT}{q}\ln\left(\frac{T}{T_0}\right) + \frac{KT}{q}\ln\left(\frac{I_c(T)}{I_c(T_0)}\right) \quad (1)$$

where $V_{be}$(Q1) is the temperature dependent base-emitter voltage of the first bipolar transistor Q1, $V_{G0}$ is the bandgap energy voltage, assumed to be about 1.205 volts for silicon, T is the operating absolute temperature, $T_0$ is the reference absolute temperature, generally, the middle point in the temperature range, $V_{be}(T_0)$ is the base-emitter voltage of the first transistor Q1 at the reference temperature $T_0$, K is Boltzmann's constant, q is the electron charge, $I_c(T)$ is the collector current in the first bipolar transistor Q1 at temperature T, $I_c(T_0)$ is the collector current in the first bipolar transistor Q1 at the reference temperature $T_0$, σ is the saturation current temperature exponent of the first bipolar transistor Q1.

A PTAT voltage which is derived from the difference of the base-emitter voltages of the first transistor Q1, and a second substrate bipolar transistor Q2, is developed across a first resistor r1 and is scaled onto a second resistor r2. The scaled PTAT voltage across the second resistor r2 is summed with the CTAT voltage of the first transistor Q1 to provide the bandgap voltage reference $V_{ref}$ across an output terminal 100 and a ground terminal 101.

The bases of the first and second transistors Q1 and Q2 are coupled to the ground terminal 101, and thus are held at a common base voltage, namely, ground. The emitter area of the second transistor Q2 is n2 times the emitter area of the first transistor Q1, and the first transistor Q1 is operated at a higher current density than the second transistor Q2. An operational amplifier (op-amp) A1 holds its respective inverting input Inn and its non-inverting input Inp at substantially the same voltage, and thus, the difference in the base-emitter voltages of the first and second transistors Q1 and Q2, which is a PTAT voltage is developed across the first resistor r1. As a result, the current flowing through the first resistor r1 is a PTAT current Ip. The PTAT current Ip flowing through the resistor r1 is drawn through a pMOS transistor M2 of a current mirror circuit, which also comprises pMOS transistors M1 and M3. By providing the pMOS transistor M1 as a diode connected transistor with the same aspect ratio $$\left(\frac{W}{L}\right)$$

as the pMOS transistor M2, and by providing the pMOS transistor M3 with an aspect ratio n1 times larger than the aspect ratio of the pMOS transistors M1 and M2, the current flowing through the second resistor r2 which forward biases the first transistor Q1 is a PTAT current of value n1.Ip. Accordingly, the difference in base-emitter voltages of the first and second transistors Q1 and Q2 developed across the first resistor r1 is:

$$V_{r1} = \Delta V_{be} = \frac{KT}{q}\ln(n1.n2) \quad (2)$$

where $V_{r1}$ is the voltage developed across the resistor r1 at temperature T, $\Delta V_{be}$ is the difference in the base-emitter voltages of the first and second transistors Q1 and Q2, n1 is the aspect ratio of the pMOS transistor $M_3$ to the pMOS transistor $M_1$, n2 is the ratio of the emitter area of the second transistor Q2 to the emitter area of the first transistor Q1.

The scaled value of the difference in the base-emitter voltages developed across the resistor r2 is given by the equation:

$$V_{r2} = n1\frac{r2}{r1}\Delta Vbe = n1\frac{r2}{r1}\frac{KT}{q}\ln(n1n2) \quad (3)$$

where r1 is the resistance value of the resistor r1 and r2 is the resistance value of the resistor r2.

Thus, the bandgap voltage reference $V_{ref}$ relative to ground is given by the equation:

$$V_{ref} = V_{be}(Q1) + n1\frac{r2}{r1}\frac{KT}{q}\ln(n1n2) \quad (4)$$

Bandgap voltage reference circuits have been well known in the art since the early 1970s as is evidenced by the IEEE publications of Robert Widlar (IEEE Journal of Solid State Circuits Vol. SC-6 No. 1, February 1971) and A. Paul Brokaw (IEEE Journal of Solid State Circuits Vol. SC-9 No. 6, December 1974). A detailed discussion on bandgap voltage reference circuits including examples of prior art bandgap voltage reference circuits is provided in co-pending U.S. patent application Ser. No. 10/375,593 of Stefan Marinca, which was filed on Feb. 27, 2003, the contents of which are incorporated herein by reference. Bandgap voltage reference circuits are described in, for example, U.S. Pat. No. 4,808,908 of Lewis, et al and U.S. Pat. No. 5,352,973 of Audy.

Typically, the CTAT base-emitter voltage of a bipolar transistor operating at room temperature is of the order of 0.7 volts, and the difference in the base-emitter voltages $\Delta V_{be}$ of two transistors operating at room temperature at different current densities is in the order of 100 millivolts or less. Thus, in order to balance the CTAT base-emitter voltage of a bipolar transistor, the PTAT voltage developed by the difference in the base-emitter voltages $\Delta V_{be}$ must be amplified by a gain factor of the order of five in order to provide a PTAT voltage of the order of 0.5 volts for summing with the CTAT voltage. Accordingly, the PTAT voltage developed across the resistor r1 of the prior art bandgap circuit of FIG. 1 must be amplified by a factor of five to produce the PTAT voltage developed across the resistor r2 for summing with the CTAT base-emitter voltage of the transistor Q1. With the PTAT voltage so amplified, the bandgap voltage reference circuit of FIG. 1 produces a bandgap voltage reference of approximately 1.25 volts with a temperature curvature error TlnT of approximately 2.5 millivolts over a typical industrial temperature range of from −40° C. to +85° C. Correction of the voltage reference to remove the TlnT temperature curvature, which is described in U.S. Pat. No. 5,352,973 of Audy, typically results in the bandgap voltage reference being reduced to approximately 1.16 volts.

Due to process variations in CMOS processes, the bandgap voltage reference of bandgap voltage reference circuits varies from lot to lot, wafer to wafer within the same lot, and indeed even from part to part from the same wafer. The variation in the bandgap voltage reference from wafer to wafer of the same lot is due largely to voltage offsets in the op-amp and in the current mirror circuit. Voltage offsets due to current mirror offsets can be reduced by replacing the MOS transistors of the current mirror circuit with resistors, as is illustrated in the prior art bandgap voltage reference circuit of FIG. 2.

The bandgap voltage reference $V_{ref}$ of the prior art bandgap voltage reference circuit of FIG. 2 is produced at the output of the op-amp A1 on a terminal 100, and is provided relative to ground 101. However, in the bandgap voltage reference circuit of FIG. 2, input voltage offset of the op-amp and the input noise of the op-amp are amplified into the bandgap voltage reference by the closed loop gain G of the op-amp A1, which is given by the following equation:

$$G = 1 + \frac{r2}{r1} \quad (5)$$

In CMOS processes, op-amp input voltage offsets are typically of the order of millivolts, and where the PTAT base-emitter voltage difference $\Delta V_{be}$ is amplified by a factor of the order of five, the op-amp input voltage offset appears in the amplified PTAT voltage as a voltage error of more than 6 millivolts. The bandgap voltage reference of the circuit of FIG. 2 is of the order of 1.25 volts, and thus the voltage error resulting from op-amp input voltage offset is approximately 6 millivolts in the 1.25 volts bandgap voltage reference.

Bandgap voltage reference circuits have been provided to reduce the sensitivity of the bandgap voltage reference to op-amp voltage offsets, and one such prior art bandgap voltage reference circuit is illustrated in FIG. 3. The prior art bandgap voltage reference circuit of FIG. 3 comprises stacked first bipolar transistors Q1 and Q3, and stacked second bipolar transistors Q2 and Q4 of larger emitter areas than that of the first transistors Q1 and Q3. The stack of first transistors are operated at a higher current density than the stack of second transistors to produce a base-emitter voltage difference which is a PTAT voltage, and is developed across the resistor r1. In this case the PTAT voltage developed across the resistor r1 is $2\Delta V_{be}$, and is gained up across the resistor r4, and summed with the CTAT voltages developed by the two transistors Q1 and Q3 to produce the bandgap voltage reference $V_{ref}$ between the output of the op-amp A1 on a terminal 100 and ground 101. The forward biasing emitter currents for the first and second transistors Q1 to Q4 are generated directly from the bandgap voltage reference through the resistors r2, r3, r4 and r5. However, the resistors r2, r4 and r5 could be replaced by a MOS current mirror device, if the error due to MOS transistors in the bandgap voltage reference could be tolerated.

Since the CTAT voltage of the bandgap voltage reference circuit of FIG. 3 is provided by the base-emitter voltages of two transistors, namely, the transistors Q1 and Q3, the CTAT voltage is approximately 1.4 volts. Additionally, since the PTAT voltage developed across the resistor r1 results from the difference in the base-emitter voltages of the two pairs of transistors operating at different current densities, the PTAT voltage developed across the resistor r1 is approximately 200 millivolts. To balance the CTAT voltage of 1.4 volts, the PTAT voltage developed across the resistor r1 must be amplified by a factor of five and developed across the resistor r4, in order to produce a PTAT voltage of approximately 1 volt for summing with the CTAT voltage. Thus, the bandgap voltage reference produced by the prior art bandgap voltage reference circuit of FIG. 3 is approximately 2.5 volts, and is greater than the bandgap voltage reference produced by the circuits of FIGS. 1 and 2. However, since the PTAT voltage is amplified by a factor of five, the input voltage offset of the op-amp of the prior art bandgap voltage reference circuit of FIG. 3 is also amplified by a factor of five. Assuming a similar input voltage offset for the op-amp of the circuit of FIG. 3, as that for the op-amp of the circuit of FIG. 2, the absolute value of the voltage error resulting from the op-amp voltage offset which is reflected into the bandgap voltage reference of the circuit of FIG. 3 is similar at approximately 6 millivolts. However, the relative value of the op-amp voltage offset in the bandgap voltage reference is reduced to 6 millivolts in 2.5 volts, as opposed to the relative value of the op-amp voltage offset of 6 millivolts in the bandgap voltage reference of 1.25 volts in the prior art circuits of FIGS. 1 and 2. Accordingly, the relative contribution of the voltage offset of the op-amp in the bandgap voltage reference is reduced in the bandgap voltage reference circuit of FIG. 3, and thus the sensitivity of the bandgap voltage reference to such op-amp voltage offset is similarly reduced.

U.S. Pat. No. 6,614,209 of Gregoire discloses a bandgap voltage reference circuit which avoids the need to amplify the PTAT voltage, or at least minimise the gain by which the PTAT voltage must be amplified. By providing the PTAT voltage without amplification, or if amplification is required, by minimising the gain, the effect of op-amp voltage offset in the bandgap voltage reference is minimised. Gregoire couples a plurality of PTAT voltage cells in series so that the PTAT voltages developed by the respective cells are summed together, and the summed PTAT voltages are then summed with a CTAT voltage developed across the base-emitter of a bipolar transistor. Each PTAT voltage cell of the bandgap voltage reference circuit of Gregoire comprises an op-amp and two stacks of bipolar transistors, one of which is coupled to the inverting input of the corresponding op-amp, and the other of which is coupled to the non-inverting input of the op-amp. One of the stacks in each PTAT voltage cell of Gregoire comprises two transistors, while the other comprises three transistors. The third transistor is provided for complementing a non-PTAT voltage component which would otherwise arise in the sum of the PTAT voltages.

However, the bandgap voltage reference circuit of Gregoire suffers from a serious disadvantage in that a relatively high supply voltage is required to power the op-amps, and in particular, the op-amp of the last PTAT voltage cell in the series. Even with only two PTAT voltage cells, the voltages on the inverting and non-inverting inputs of the op-amp in the last PTAT voltage cell in the series will be the equivalent of three base-emitter voltages of bipolar transistors plus three base-emitter voltage differences $\Delta V_{be}$. At a temperature of −40° C. the base-emitter voltage of each transistor is of the order of 0.8 volts, and each base-emitter voltage difference $\Delta V_{be}$ is of the order of 50 millivolts. As a result the common input voltage of the op-amp of the second PTAT voltage cell is approximately 2.55 volts at −40° C. This, thus, will require a supply voltage of at least 2.8 volts for the current mirrors supplying the forward biasing currents to the uppermost bipolar transistors of the second PTAT voltage cell. Accordingly, the bandgap voltage reference circuit of Gregoire, in general, is unsuitable for implementing in circuits with low supply voltages, such as low voltage CMOS circuits, where the supply voltage is typically limited to 2.5 volts to 2.7 volts.

In low voltage CMOS circuits, op-amps provided with PMOS input pairs require a supply voltage of approximately 0.8 volts higher than the common input voltage of the op-amp. Accordingly, if the op-amp in the last PTAT voltage cell of Gregoire were provided with pMOS input pairs, a supply voltage of more than 3.35 volts would be required. The supply voltage required by the op-amp in the last PTAT voltage cell could be reduced by providing the op-amp with nMOS input pairs, which would require a supply voltage of approximately 2.75 volts. However, even with NMOS input pairs, the op-amp in the last of the series of PTAT voltage cells of the bandgap voltage reference circuit of Gregoire would still be unable to operate within the supply voltage of 2.5 volts to 2.7 volts of low voltage CMOS processes.

However, a disadvantage of using an op-amp with an NMOS input pair, as opposed to a pMOS input pair, is that the low frequency 1/f noise for frequencies below 10 Hz increases as the frequency decreases, and in general, is approximately five times greater in an op-amp with an NMOS input pair, than in an op-amp with a pMOS input pair. Thus, in order to minimise noise from the op-amp and in turn op-amp voltage offset being reflected into the bandgap voltage reference, it is preferable to use op-amps with pMOS input pairs. However, as discussed above, this imposes a further limitation on the available headroom within the op-amp can operate.

Accordingly, there is a need for a bandgap voltage reference circuit for producing a bandgap voltage reference which is suitable for operating in relatively low supply voltage environments, and in which the effect of op-amp voltage offsets is minimised.

The present invention is directed towards providing such a bandgap voltage reference circuit, and the invention is also directed towards providing a method for producing a bandgap voltage reference from a relatively low supply voltage, and with the effect of op-amp voltage offsets in the bandgap voltage reference minimised. The invention is also directed towards providing a PTAT voltage generating circuit for generating a PTAT voltage, which is suitable for operating in a relatively low supply voltage environment, and in which the effect of op-amp voltage offsets in the PTAT voltage is minimised.

SUMMARY OF THE INVENTION

According to the invention there is provided a PTAT voltage generating circuit comprising:

a primary impedance element across which a PTAT voltage is developed, a first circuit for generating a first voltage level for applying to a first end of the primary impedance element, the first voltage level being provided as a function of the difference of N first base-emitter voltages and M second base-emitter voltages, N and M being interger values greater than zero and being of values different to each other, the first circuit comprising a first transistor stack having at least one first transistor for providing at least one of the N first base-emetter voltages, and a second transistor stack having at least one second transistor for providing at least one of the M second base-emitter voltages, each first transistor being operated at a first current density, and each second transistor being operated at a second current density, the second current density being different to the first current density, a first impedance element and a first op-amp configured to operate in a closed loop mode co-operating with the first and second transistor stacks so that a voltage difference of the first and second base-emitter voltages in the respective first and second transistor stacks is developed across the first impedance element for providing at least a part of the first voltage level, and a second circuit for generating a second voltage level for applying to a second end of the primary impedance element, the second voltage level being provided as a function of P of said N first base-emitter voltages, where P is an integer value greater than zero, the second circuit comprising a second op-amp configured to operate in a closed loop mode and co-operating with the first transistor stack for producing the P of said N first base-emitter voltages, the second circuit co-operating with the first circuit and with the primary impedance element so that the voltage developed across the primary impedance element by the difference of the first and second voltage levels comprises said PTAT voltage.

In one embodiment of the invention the first circuit comprises a first transistor stack having at least one first transistor for providing at least one of the first base-emitter voltages, and a second transistor stack having at least one second transistor for providing at least one of the second base-emitter voltages, a first impedance element and a first op-amp configured to operate in a closed loop mode co-operating with the first and second transistor stacks for developing a voltage difference of the first and second base-emitter voltages developed in the respective first and second transistor stacks across the first impedance element from which a part of the first voltage level is derived.

Preferably, the first impedance element is coupled between one of the inverting and non-inverting inputs of the first op-amp and one of the first and second transistor stacks, and the other of the inverting and non-inverting inputs of the first op-amp is coupled to the other one of the first and second transistor stacks.

Advantageously, a second impedance element is coupled to the one of the inverting and non-inverting inputs of the first op-amp to which the first impedance element is coupled for setting the closed loop gain of the first op-amp, and the voltage difference developed across the first impedance element is reflected onto the second impedance element, the second impedance element being coupled to the first end of the primary impedance element for applying the first voltage level to the first end of the primary impedance element.

In one embodiment of the invention the first op-amp co-operates with the second transistor stack for combining at least one of the second base-emitter voltages with the voltage developed across the second impedance element for producing the first voltage level.

In another embodiment of the invention the second impedance element is coupled to the first end of the primary impedance element through the base-emitter of at least one third transistor, each third transistor developing a first base-emitter voltage for combining with the voltage developed across the second impedance element for producing the first voltage level.

In one embodiment of the invention the number of first base-emitter voltages developed in the first voltage level by the third transistors is equal to the number P of first base-emitter voltages in the second voltage level.

In another embodiment of the invention the number of first base-emitter voltages developed in the first transistor stack is greater than the number of second base-emitter voltages developed in the second transistor stack, the difference between the number of first base-emitter voltages developed in the first transistor stack and the number of second base-emitter voltages developed in the second transistor stack is equal to the number P of first base-emitter voltages provided in the second voltage level.

Preferably, the value of the first base-emitter voltages in the first voltage level derived from the first transistor stack is equal to the product of the number of first base-emitter voltages developed in the first transistor stack by the ratio of the impedance of the second impedance element to the impedance of the first impedance element, and the value of the second base-emitter voltages in the first voltage level derived from the second transistor stack is equal to the sum of the number of second base-emitter voltages developed in the second transistor stack plus the product of the number of second base-emitter voltages developed in the second transistor stack by the ratio of the impedance of the second impedance element to the impedance of the first impedance element.

Advantageously, the M second base-emitter voltages from which the first voltage level is produced are derived from the second transistor stack.

In another embodiment of the invention the P first base-emitter voltages from which the second voltage level is produced are applied to one of the inverting and non-inverting inputs of the second op-amp, and the second end of the primary impedance element is coupled to the other of the inverting and non-inverting inputs of the second op-amp, so that as the second op-amp operates to maintain the voltages on the respective inverting and non-inverting inputs thereof similar, the second voltage level is applied to the second end of the primary impedance element.

Preferably, each first base-emitter voltage of the P first base-emitter voltages of the second voltage level is derived from a corresponding one of the first base-emitter voltages developed in the first transistor stack.

In one embodiment of the invention an output impedance element co-operates with the primary impedance element for setting the closed loop gain of the second op-amp, the voltage developed across the primary impedance element being reflected across the output impedance element by the ratio of the impedance of the output impedance element to the impedance of the primary impedance element for providing an output voltage comprising a PTAT voltage across the output impedance element.

In another embodiment of the invention the first end of the primary impedance element is coupled to the output of one of the first and second op-amps, and the output impedance element is coupled between the one of the inverting and non-inverting inputs of the second op-amp to which the primary impedance is coupled and the output of the one of the first and second op-amps to which the primary impedance element is not coupled.

In a further embodiment of the invention the one of the primary impedance element and the output impedance element which is coupled to the output of the second op-amp is coupled to one of the inverting and non-inverting inputs of the second op-amp to provide negative feedback from the output of the second op-amp.

In one embodiment of the invention the first end of the primary impedance element is coupled to the output of the first op-amp. In an alternative embodiment of the invention the first end of the primary impedance element is coupled to the output of the second op-amp.

Preferably, the number of second base-emitter voltages developed in the second transistor stack is at least two second base-emitter voltages.

Advantageously, the number of first base-emitter voltages developed in the first transistor stack is equal to or greater than the number of second base-emitter voltages developed in the second transistor stack.

In one embodiment of the invention the first current density at which the first transistors are operated is greater than the second current density at which the second transistors are operated.

Preferably, the first and second voltage levels are referenced to a common ground reference voltage of the PTAT voltage generating circuit.

Advantageously, each first and second transistor is provided by a bipolar substrate transistor.

Ideally, each impedance element is a resistive impedance element.

In one embodiment of the invention the circuit is implemented in a CMOS process.

The invention also provides a bandgap voltage reference circuit for producing a bandgap voltage reference, the bandgap voltage reference circuit comprising the PTAT voltage generating circuit according to the invention for generating a PTAT voltage for summing with a CTAT voltage, and a means for summing the PTAT voltage with the CTAT voltage for providing the bandgap voltage reference.

Additionally, the invention provides a bandgap voltage reference circuit for producing a bandgap voltage reference, the bandgap voltage reference circuit comprising:

a CTAT voltage source for developing a CTAT voltage, a PTAT voltage source for developing a PTAT voltage for summing with the CTAT voltage, the PTAT voltage source comprising:

a primary impedance element across which a PTAT voltage is developed, a first circuit for generating a first voltage level for applying to a first end of the primary impedance element, the first voltage level being provided as a function of the difference of N first base-emitter voltages and M second base-emitter voltages, N and M being interger values greater than zero and being of values different to each other, the first circuit comprising a first transistor stack having at least one first transistor for providing at least one of the N first base-emitter voltages, and a second transistor stack having at least one second transistor for providing at least one of the M second base-emitter voltages, each first transistor being operated at a first current density, and each second transistor being operated at a second current density, the second current density being different to the first current density, a first impedance element and a first op-amp configured to operate in a closed loop mode co-operating with the first and second transistor stacks so that a voltage difference of the first and second base-emitter voltages in the respective first and second transistor stacks is developed across the first impedance element for providing at least a part of the first voltages level, and a second circuit for generating a second voltage level for applying to a second end of the primary impedance element, the second voltage level being provided as a function of P of said N first base-emitter voltages, where P is an integer value greater than zero, the second circuit comprising a second op-amp configured to operate in a closed loop mode and co-operating with the first transitor stack for producing the P of said N first base-emitter voltages, the second circuit co-operating with the first circuit and with the primary impedance element so that the voltage developed across the primary impedance element by the difference of the first and second voltage levels comprises said PTAT voltage, and a means for summing the PTAT voltage with the CTAT voltage.

In one embodiment of the invention an output impedance element is provided for co-operating with the primary impedance element so that the voltage developed across the primary impedance element is reflected onto the output impedance element by the ratio of the impedance of the output impedance element to the impedance of the primary impedance element for providing the PTAT voltage on the output impedance element for summing with the CTAT voltage.

In another embodiment of the invention the output impedance element co-operates with the primary impedance element for setting the closed loop gain of the second op-amp.

Preferably, the P first base-emitter voltages of the second voltage level form the CTAT voltage, and the second op-amp co-operates with the output impedance for forming the summing means for summing the CTAT voltage provided by the P first base-emitter voltages with the PTAT voltage developed across the output impedance element for providing the bandgap voltage reference.

Advantageously, the first and second voltage levels are referenced to a common ground reference voltage of the bandgap voltage reference circuit, and the bandgap voltage reference is derived from the end of the output impedance element which is coupled to the output of one of the first and second op-amps, and is referenced to the common ground voltage.

In one embodiment of the invention the emitters of the first and second transistors of the respective first and second transistor stacks are forward biased with a PTAT current.

Preferably, the bandgap voltage reference is provided with TlnT temperature curvature correction.

Advantageously, the forward biasing current of at least one of the second transistors of the second transistor stack comprises a CTAT current component for providing the TlnT temperature curvature correction of the bandgap voltage reference.

Further the invention provides a method for generating a PTAT voltage across a primary impedance element, the method comprising the steps of:

applying a first voltage level to a first end of the primary impedance element, the first voltage level being provided as a function of the difference of N first base-emitter voltages and M second base-emitter voltages, N and M being integer values greater than zero and being of values different to each other, and the first voltage level being produced by a first circuit comprising a first transistor stack having at least one first transistor for providing at least one of the N first base-emitter voltages, and a second transistor stack having at least one second transistor for providing at least one of the M second base-emitter voltages, each first transistor beiong operated at a first current density, and each second transistor being operated at a second current density, the second current density being different to the first current density, a first impedance element and a first op-amp configured to operate in a closed loop mode co-operating with the first and second transistor stacks so that a voltage difference of the first and second base-emitter voltages in the respective first and a second transistor stacks is developed across the first impedance element for providing at least a part of the first voltage level, and applying a second voltage level to a second end of the primary impedance element, the second voltage level being provided as a function of P of said N first base-emitter voltages, where P is an integer value greater than zero, the second voltage level being produced by a second circuit comprising a second op-amp configured to operate in a closed loop mode and co-operating with the first transistor stack for producing the P of said N first base-emitter voltages, the first and second voltage levels being applied to the respective first and second ends of the primary impedance element by the first and second circuits so that the voltage developed across the primary impedance element by the difference of the first and second voltage levels comprises said PTAT voltage.

Additionally, the invention provides a method for generating a bandgap voltage reference comprising the steps of:

providing a CTAT voltage from a CTAT voltage source, providing a PTAT voltage for summing with the CTAT voltage, the PTAT voltage being provided by applying a first voltage level to a first end of a primary impedance element, the first voltage level being provided by as a function of the difference of N first base-emitter voltages and M second base-emitter voltages, N and M being integer values greater than zero and being of values different to each other, the first voltage level being producede by a first circuit comprising a first transistore stack having at least one first transistor for providing at least one of the N first base-emitter voltages, and a second transistor stack having at least one second transistor for providing at least one of the M second base-emitter voltages, each first transistor being operated at a first current density, and each second transistor being operated at a second current density, the second current density being different to the first current density, a first impedance element and a first op-amp configured to operate in a closed loop mode co-operating with the first and second transistor stacks so that a voltage difference of the first and second base-emitter voltages in the respective tirst and second transistor stacks is developed across the first impedance element for providing at least a part of the first voltage level, and applying a second voltage level to a second end of the primary impedance element, the second voltage level being provided as a function of P of said N first base-emitter voltages, where P is an integer value greater than zero, the second voltage level being produced by a second circuit comprising a second op-amp configured to operate in a closed loop mode and co-operating with the first transistor stack for producing the P of said N first base-emitter voltages, the first and second voltage levels being applied to the respective first and second ends of the primary impedance element by the first and second circuits so that the voltage developed across the primary impedance element by the difference of the first and second voltage levels comprises said PTAT voltage, and summing the PTAT voltage developed across the primary impedance element with the CTAT voltage.

ADVANTAGES OF THE INVENTION

The advantages of the invention are many. The bandgap voltage reference circuit according to the invention is particularly suitable for operating with relatively low supply voltages, and is thus particularly suitable for use in low voltage environments, such as low voltage CMOS environments where the supply voltage is limited to 2.5 to 2.7 volts. Additionally, and of particular importance, the bandgap voltage reference circuit according to the invention produces a bandgap voltage reference with sensitivity to offsets and noise, and in particular, op-amp voltage offsets minimised. By providing the bandgap voltage reference circuit in the form of a first circuit and a second circuit, which develop respective first and second voltage levels, which are applied to the first and second ends, respectively, of the primary impedance element, so that the first and second voltage levels co-operate for developing a voltage across the primary impedance element as a PTAT voltage, provides the particular advantage that where the first and second circuits comprise first and second op-amps, respectively, the common input voltage to the respective first and second op-amps can be minimised. This, thus, allows the bandgap voltage reference circuits according to the invention to be operated at relatively low supply voltages. Additionally, by providing the bandgap voltage reference circuit with the first and second circuits with respective first and second op-amps, the PTAT voltage which is developed across the output impedance element from the primary impedance element is gained up by a significantly greater gain factor than the gain factors by which the input voltage offsets of the respective first and second op-amps are gained up and reflected in the PTAT voltage developed across the output impedance element. Accordingly, the sensitivity of the bandgap voltage reference to op-amp voltage offsets is minimised, and is significantly reduced over prior art bandgap voltage reference circuits.

Furthermore, by virtue of the fact that the common input voltages of the respective first and second op-amps can be maintained relatively low, the first and second op-amps can be provided with pMOS input pairs even when the bandgap voltage reference circuits according to the invention are operating in low voltage CMOS environments. The fact that the first and second op-amps can be provided with pMOS input pairs minimises the noise in the bandgap voltage reference produced by the bandgap voltage reference circuit.

The advantages which are achieved from the bandgap voltage reference circuits according to the invention are also obtained from the PTAT voltage generating circuits according to the invention.

The invention and its many advantages will be readily apparent to those skilled in the art from the following description of some preferred embodiments thereof, which are given by way of example only, with reference to the accompanying drawings.

DETAILED DESCRIPTION OF SOME PREFERRED EMBODIMENTS OF THE INVENTION

Figure 4:
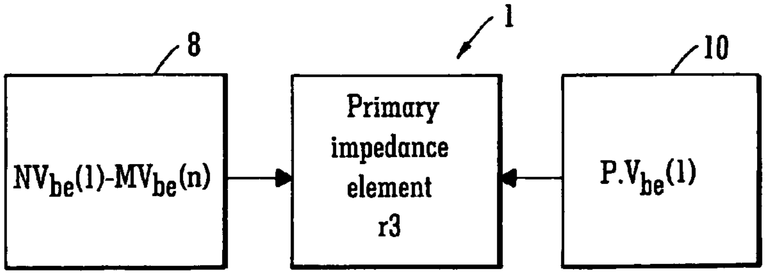
FIG. 4 is a block representation of a bandgap voltage reference circuit according to the invention.
Figure 3:
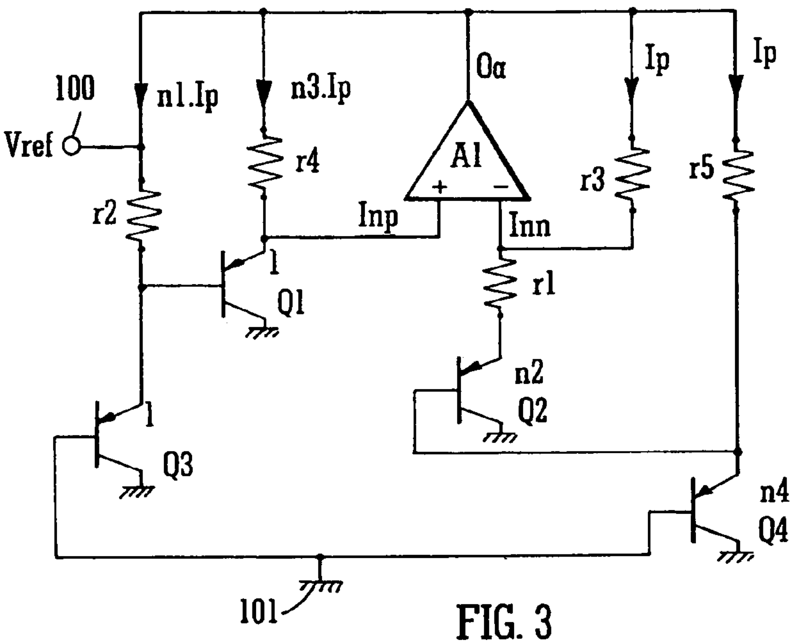
FIG. 3 is a circuit diagram of a further prior art bandgap voltage reference circuit.
Figure 5:
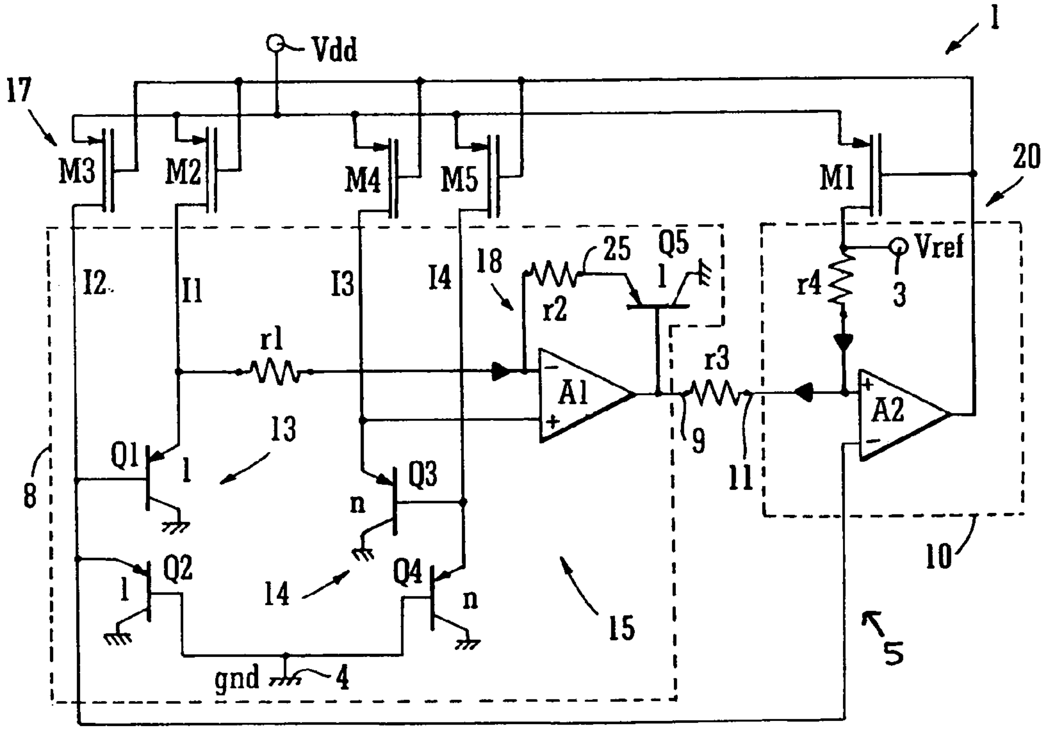
FIG. 5 is a circuit diagram of the bandgap voltage reference circuit of FIG. 4, FIGS. 6(*a*) to (*c*) illustrate waveforms of voltages and currents developed in the bandgap voltage reference circuit of FIG. 4.

Referring to the drawings and initially to FIGS. 4 and 5, there is illustrated a bandgap voltage reference circuit according to the invention, indicated generally by the reference numeral 1, for producing a bandgap voltage reference $V_{ref}$ on a voltage reference output terminal 3, which is referenced to a common ground voltage terminal 4 of the bandgap voltage reference circuit 1. The bandgap voltage reference circuit 1 is suitable for operating with a relatively low supply voltage $V_{dd}$, and produces the bandgap voltage reference $V_{ref}$ with the effect of op-amp voltage offsets in the bandgap voltage reference $V_{ref}$ minimised. The bandgap voltage reference circuit 1 comprises a PTAT voltage generating circuit which is also according to the invention and indicated generally by the reference numeral 5 for producing a PTAT voltage across a primary impedance element, namely, a primary resistor r3, which is in turn reflected across an output impedance element, namely, an output resistor r4 to produce an output PTAT voltage. The output PTAT voltage, which is developed across the output resistor r4 is summed with a CTAT voltage as will be described below for producing the bandgap voltage reference $V_{ref}$ on the output terminal 3.

The PTAT voltage generating circuit 5 comprises a first circuit 8 for developing a first voltage level relative to the common ground voltage terminal 4 for applying to a first end 9 of the primary resistor r3, and a second circuit 10 for developing a second voltage level relative to the common ground voltage terminal 4 for applying to a second end 11 of the primary resistor r3. The first voltage level is derived from the voltage difference between N first base-emitter voltages, and M second base-emitter voltages as will be described below, and the second voltage level is derived from P first base-emitter voltages, as will also be described below, so that the voltage developed across the primary resistor r3 resulting from the difference of the first voltage level and the second voltage level is a PTAT voltage.

The first circuit 8 comprises a PTAT voltage generating cell 15 comprising a first transistor stack 13 having two first substrate bipolar transistors Q1 and Q2, and a second transistor stack 14 having two second substrate bipolar transistors Q3 and Q4. The emitter area of each of the first transistors Q1 and Q2 is assumed to be unit area, and the emitter area of each of the second transistors Q3 and Q4 is n times the emitter area of one of the first transistors Q1 and Q2. Identical PTAT currents I1, I2, I3 and I4 supplied from a current mirror circuit 17, as will be described below, forward bias the first and second transistors Q1 to Q4, respectively, for operating the first transistors Q1 and Q2 at a first current density for producing first base-emitter voltages, and for operating the second transistors Q3 and Q4 at a second current density which is less than the first current density for producing second base-emitter voltages. In this embodiment of the invention the P first base-emitter voltages of the second voltage level which is provided by the second circuit 10 are derived from the first transistor stack 13, and some of the N first base-emitter voltages of the first voltage level provided by the first circuit 8 are derived from the first transistor stack 13. The M second base-emitter voltages of the first voltage level provided by the first circuit 8 are derived from the second transistor stack 14.

The first circuit 8 also comprises a first op-amp A1, the non-inverting input of which is coupled to the emitter of the uppermost second transistor Q3 of the second transistor stack 14, and the inverting input of which is coupled through a first impedance element, namely, a first resistor r1 to the emitter of the uppermost first transistor Q1 of the first transistor stack 13. Thus, as the first op-amp A1 operates to maintain the voltage on its inverting input similar to the voltage on its non-inverting input, a PTAT voltage $2\Delta V_{be}$ provided by the difference of the first base-emitter voltages of the first transistors Q1 and Q2 and the second base-emitter voltages of the second transistors Q3 and Q4 is developed across the first resistor r1.

The output of the first op-amp A1 is coupled to the first end 9 of the primary resistor r3. A feedback loop 18 comprising a second impedance element, namely, a second resistor r2 and a third substrate bipolar transistor Q5 is coupled between the output and the inverting input of the first op-amp A1 for operating the first op-amp A1 in a closed loop mode. The second resistor r2 co-operates with the first resistor r1 for setting the closed loop gain of the first op-amp A1. The second resistor r2 is coupled through the emitter and base of the third transistor Q5 to the output of the first op-amp A1 and also to the first end 9 of the primary resistor r3. The third transistor Q5 is identical to each of the first transistors Q1 and Q2, and is of unity emitter area similar to the emitter areas of the first transistors Q1 and Q2. The third transistor Q5 is forward biased by a PTAT current through the second resistor r2, which operates the third transistor Q5 substantially at the first current density, thereby developing one first base-emitter voltage, which provides one of the N first base-emitter voltages of the first voltage level provided by the first circuit 8. The value of the first voltage level which is applied to the first end 9 of the primary resistor r3, and its derivation will be described in detail below.

The second circuit 10 comprises a second op-amp A2, the non-inverting input of which is coupled to the second end 11 of the primary resistor r3. In this embodiment of the invention the number of P first base-emitter voltages of the second voltage level, which is applied by the second circuit 10 to the second end 111 of the primary resistor r3 is one first base-emitter voltage, which is derived from the first transistor Q2 of the first transistor stack 13. The first base-emitter voltage of the first transistor Q2 is applied to the inverting input of the second op-amp A2. A negative feedback loop 20, which comprises the output resistor r4 and a pMOS transistor M1 of the current mirror circuit 17 operates the second op-amp A2 in a closed loop mode. Feedback signals through the gate and drain of the pMOS transistor M1 are inverted, thereby providing negative feedback through the feedback loop 20. The output resistor r4 and the primary resistor r3 co-operate to set the closed loop gain of the second op-amp A2. As the second op-amp A2 operates to maintain the voltage on its non-inverting input similar to the voltage on its inverting input, the second op-amp A2 applies the second voltage level to the second end 11 of the primary resistor r3, which in this embodiment of the invention is the one first base-emitter voltage derived from the first transistor Q2 of the first transistor stack 13. The PTAT voltage developed across the primary resistor r3 is gained up and reflected across the output resistor r4 in the ratio of the resistance of the output resistor r4 to the resistance of the primary resistor r3, as will be described below to provide the output PTAT voltage.

The first base-emitter voltage derived from the first transistor Q2 of the first transistor stack 13, which is applied to the inverting input of the second op-amp A2 is a CTAT voltage, and also provides the CTAT voltage to be summed with the output PTAT voltage to produce the bandgap voltage reference on the output terminal 3. Since the second op-amp A2 operates to maintain its non-inverting input at the same voltage as its inverting input, the voltage on the non-inverting input of the second op-amp is likewise the first base-emitter CTAT voltage. The bandgap voltage reference on the output terminal 3 relative to the common ground voltage terminal 4 is thus the summation of the CTAT first base-emitter voltage applied to the inverting input of the second op-amp A2, and the output PTAT voltage developed across the output resistor r4, which is thus substantially temperature stable for a specific ratio of the resistances of the first and second resistors r1 and r2, and for a specific ratio of the primary and output resistors r3 and r4.

Since the voltage developed across the output resistor r4 is a PTAT voltage, the current flowing through the output resistor r4 is a PTAT current. Thus, a PTAT current is pulled through the pMOS transistor of the current mirror circuit 17, which is thus reflected in pMOS transistors M2 to M5 which provide the PTAT forward biasing currents I1, I2, I3 and I4 to the first transistors Q1 and Q2, and the second transistors Q3 and Q4, respectively. The pMOS transistors M2 to M5 are scaled relative to the pMOS transistor M1 so that the forward biasing PTAT currents I1, I2, I3 and I4 are identical to each other.

In this embodiment of the invention the collectors of the first and second transistors Q1, Q2, Q3 and Q4, and the third transistor Q5 are held at ground, and the bases of the lowermost first and second transistors Q2 and Q4 of the first and second transistor stacks 13 and 14, respectively, are coupled to the common ground voltage terminal 4.

The PTAT voltage and its derivation which is developed across the primary resistor r3, and which is in turn reflected onto the output resistor r4 to provide the output PTAT voltage will now be described in detail with reference to the following equations.

The voltage developed across the first resistor r1 is the difference $2\Delta V_{be}$ of the first and second base-emitter voltages developed by the first transistors Q1 and Q2, and the second transistors Q3 and Q4, respectively. Since the base-emitter voltage difference $2\Delta V_{be}$ developed across the first resistor r1 is a PTAT voltage, the current flowing through the first resistor $I_{r1}$ is similarly a PTAT current, and is thus given by the equation:

$$I_{r1} = \frac{V_{r1}}{r1} = \frac{2\Delta V_{be}}{r1} \tag{6}$$

where $V_{r1}$ is the voltage developed across the first resistor r1, and r1 is the resistance value of the first resistor r1.

The inverting and non-inverting inputs of the first op-amp A1 are high impedance inputs, and thus the current flowing through the second resistor r2 is equal to the current flowing through the first resistor r1, namely, the PTAT current $I_{r1}$. The first op-amp operates to keep its inverting input at the same voltage as its non-inverting input, and accordingly, the voltage $V_{25}$ on the node 25 between the second resistor r2 and the emitter of the third transistor Q5 relative to the common ground voltage terminal 4 is equal to the difference of the two second base-emitter voltages developed in the second transistor stack 14, and the PTAT voltage developed across the second resistor r2, and is given by the equation:

$$V_{25} = 2V_{be}(n) - \frac{2\Delta V_{be}}{r1}r2 \tag{7}$$

where $V_{be}$(n) is the second base-emitter voltage of each of the second transistors Q3 and Q4, and r2 is the resistance value of the second resistor r2.

From equation (7) the voltage $V_{O1}$ on the output of the first op-amp A1, which is the first voltage level applied to the first end 9 of the primary resistor r3, is given by the equation:

$$V_{O1} = 2V_{be}(n) - \frac{2\Delta V_{be}}{r1}r2 - V_{be}(1) \tag{8}$$

where $V_{be}(1)$ is the first base-emitter voltage of the third transistor Q5, which is assumed to be the same as the first base-emitter voltage $V_{be}(1)$ developed by each of the first transistors Q1 and Q2.

Since the second op-amp A2 operates to maintain the voltage on its non-inverting input at the same voltage as its inverting input, the voltage on the non-inverting input of the second op-amp A2 relative to the common ground voltage terminal 4 is $V_{be}(1)$, namely, the first base-emitter voltage which is derived from the lowermost first transistor Q2 of the first transistor stack. This is the second voltage level which is applied to the second end 11 of the primary resistor r3. Therefore, the voltage developed across the primary resistor r3, namely, the voltage $V_{r3}$ is given by the equation:

$$V_{r3} = V_{be}(1) - V_{O1} \tag{9}$$

Substituting in equation (9) for $V_{O1}$ from equation (8) gives:

$$V_{r3} = V_{be}(1) - 2V_{be}(n) + \frac{2\Delta V_{be}}{r1}r2 + V_{be}(1) \tag{10}$$

Equation (10) can be rewritten as:

$$V_{r3} = 2\Delta V_{be} + \frac{2\Delta V_{be}}{r1}r2 \tag{11}$$

which in turn can be rewritten as:

$$V_{r3} = 2\Delta V_{be}\left[1 + \frac{r2}{r1}\right] \tag{11a}$$

Accordingly, in this embodiment of the invention the voltage developed across the primary resistor r3 is a pure PTAT voltage which comprises two components. The second component of equation (11), namely, $$\frac{2\Delta V_{be}}{r1}r2$$

is part of the first voltage level, and is the PTAT voltage scaled up from the PTAT voltage developed across the first resistor r1, and is scaled up by the resistance ratio of the second to the first resistors, namely, $$\frac{r2}{r1}.$$

The first component from equation (11), namely, $2\Delta V_{be}$ is a PTAT voltage, and is provided by the first and second voltage levels. One of the first base-emitter voltages is the first base-emitter voltage of the second voltage level provided by the second circuit 10, and is derived from the first transistor Q2 of the first transistor stack 13. The first base-emitter voltage from the first transistor Q2 is applied to the inverting input of the second op-amp A2 relative to the ground reference voltage on the ground reference terminal 4. The other first base-emitter voltage is provided by one of the first base-emitter voltages of the first voltage level from the first circuit 8, and is derived from the third transistor Q5 of the first circuit 8. The two second base-emitter voltages of the first component $2\Delta V_{be}$ of equation (11) are provided by the first voltage level from the first circuit 8, and are derived from the two second transistors Q3 and Q4 of the second transistor stack 14, due to the fact that the two second base-emitter voltages of the two second transistors Q3 and Q4 as well as contributing to the development of the PTAT voltage developed across the first resistor r1 also raise the voltage on the non-inverting input of the first op-amp A1 above the common ground reference of the common ground terminal 4 by the value of the two second base-emitter voltages, which in turn are applied directly to the first end 9 of the primary resistor r3. Accordingly, the first voltage level which is applied to the first end 9 of the primary resistor r3 by the first circuit 8 is as follows:

$$2V_{be}(n)\frac{r2}{r1} - 2V_{be}(1)\frac{r2}{r1} + 2V_{be}(n) - V_{be}(1)$$

The second voltage level from the second circuit 10 is $V_{be}(1)$.

Accordingly, in this embodiment of the invention the number N of first base-emitter voltages of the first voltage level is $$1 + \frac{2r2}{r1}$$

first base-emitter voltages, and the number M of second base-emitter voltages in the first voltage level is $$2 + \frac{2r2}{r1}$$

second base-emitter voltages. The number P of first base-emitter voltages of the second voltage level is one first base-emitter voltage. If the resistances of the first and second resistors are, for example, similar in order to provide the ratio $$\frac{r2}{r1}$$

to be one, then in this embodiment of the invention the number N of first base-emitter voltages in the first voltage level would be three first base-emitter voltages, and the number M of second base-emitter voltages in the first voltage level would be four, while the number P of first base-emitter voltages in the second voltage level would be one.

On the other hand, if the resistances of the first and second resistors r1 and r2 were selected to provide a resistance ratio $$\frac{r2}{r1}$$

to be equal to, for example, four, then the number N of first base-emitter voltages in the first voltage level would be nine, and the number M of second base-emitter voltages in the first voltage level would be ten, while the number P of first base-emitter voltages in the second voltage level would still be one.

The current flowing through the primary resistor r3 is given by the equation:

$$I_{r3} = \frac{V_{r3}}{r3} \tag{12}$$

where r3 is the resistance value of the primary resistor r3.

Thus, substituting for $V_{r3}$ in equation (12) from equation (11) gives:

$$I_{r3} = \frac{2\Delta V_{be}}{r3} + \frac{2\Delta V_{be}}{r1r3}r2 \tag{13}$$

The inverting and non-inverting inputs of the second op-amp A2 are high impedance inputs, and thus the current flowing through the output resistor r4 is equal to the current flowing through the primary resistor r3, namely, $I_{r3}$ Accordingly, the voltage developed across the output resistor r4, namely, $V_{r4}$ is given by the equation:

$$V_{r4=Ir3}r4 \tag{14}$$

where r4 is the resistance value of the output resistor r4.

Substituting for the current $I_{r3}$ from equation (13) in equation (14) gives the voltage developed across the output resistor r4, namely, $V_{r4}$ as:

$$V_{r4} = \frac{2\Delta V_{be}}{r3}r4 + \frac{2\Delta V_{be}}{r1 \cdot r3}r2r4 \tag{15}$$

which can be rewritten as:

$$Vr4 = 2\Delta V_{be}\left(1 + \frac{r2}{r1}\right)\frac{r4}{r3} \tag{16}$$

Accordingly, the voltage developed across the output resistor r4 is reflected from the primary resistor r3 and is gained up by the ratio of the resistance r4 of the output resistor r4 to the resistance r3 of the primary resistor r3. Thus, the voltage $V_{r4}$ developed across the output resistor r4 is a pure PTAT voltage.

Since the first base-emitter voltage derived from the first transistor Q2 is applied to the inverting input of the second op-amp, the inverting input of the second op-amp is at a voltage equal to one base-emitter voltage above the common ground voltage of the common ground terminal 4, which is thus a CTAT voltage. Accordingly, as the second op-amp A2 operates to maintain the voltage on its non-inverting input similar to the first base-emitter CTAT voltage on its inverting input, the first base-emitter CTAT voltage on the inverting input of the second op-amp A2 is summed with the output PTAT voltage developed across the output resistor r4 to provide the bandgap voltage reference $V_{ref}$ on the output terminal 3 relative to the common ground voltage terminal 4 which is given by the equation:

$$V_{ref} = V_{be}(1) + 2\Delta V_{be}\left(1 + \frac{r2}{r1}\right)\frac{r4}{r3} \quad (17)$$

The sensitivity of the gained up PTAT voltage developed across the output resistor r4, and in turn the bandgap voltage reference on the output terminal 3 to input voltage offsets in the respective first and second op-amps A1 and A2 is minimised, and is significantly reduced over and above the sensitivity to op-amp voltage offsets of the bandgap voltage reference produced by prior art bandgap voltage reference circuits. A comparison of the effect of voltage offsets of the first and second op-amps A1 and A2 on the bandgap voltage reference produced by the bandgap voltage reference circuit 1 of FIG. 4, with the effect of voltage offsets of the op-amp A1 on the bandgap voltage reference produced by the prior art bandgap voltage reference circuit of FIG. 2, gives an indication of the significant reduction of the effect of op-amp voltage offsets of the first and second op-amps A1 and A2 on the bandgap voltage reference produced by the bandgap voltage reference circuit 1 of FIG. 4.

Figure 1:
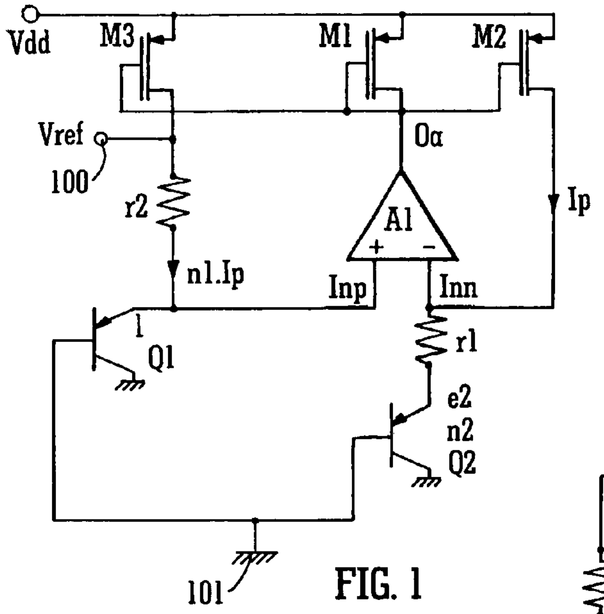
FIG. 1 is a circuit diagram of a prior art bandgap voltage reference circuit.
Figure 2:
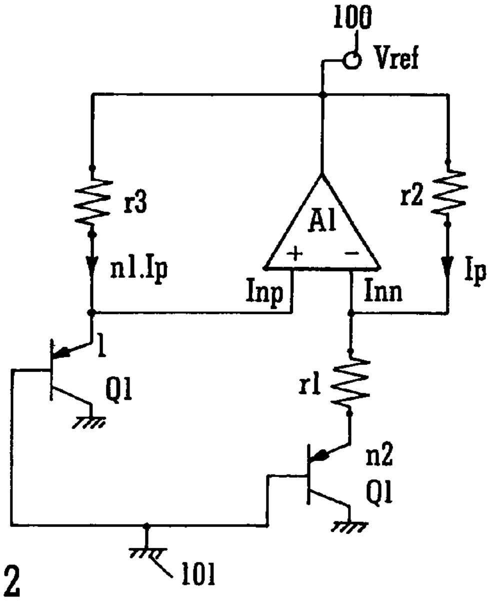
FIG. 2 is a circuit diagram of another prior art bandgap voltage reference circuit.

If it is assumed that the op-amp A1 of the prior art bandgap voltage reference circuit of FIG. 2, and the first and second op-amps A1 and A2 of the bandgap voltage reference circuit 1 of FIG. 4 have the same input voltage offsets, namely, $V_{off}$, and if the ratio $$\frac{r2}{r1}$$

of the resistances of the first and second resistors r1 and r2 of the prior art bandgap voltage reference circuit of FIG. 2 is four, in order to provide a closed loop gain of five for the op-amp A1, then the voltage offset $V_{off}$ of the op-amp A1 of the prior art circuit of FIG. 2 is reflected into the bandgap voltage reference of the prior art bandgap voltage reference circuit of FIG. 2 as:

$$V_{1(off)} = V_{off}\left(1 + \frac{r2}{r1}\right) = 5 \quad (18)$$

Thus, in the prior art bandgap voltage reference circuit of FIG. 2 the input voltage offset of the op-amp A1 is amplified by a factor of five when it appears in the bandgap voltage reference of the prior art bandgap voltage reference circuit of FIG. 2.

In the bandgap voltage reference circuit 1 of FIG. 4, the input voltage offsets of each of the first and second op-amps A1 and A2 make a contribution to the bandgap voltage reference $V_{ref}$. The voltage offset $V_{off}$ of the first op-amp A1 is reflected into the bandgap voltage reference $V_{ref}$ produced by the bandgap voltage reference circuit 1 of FIG. 4 as follows:

$$V_{21}(off) = V_{off}\left(1 + \frac{r2}{r1}\right)\frac{r4}{r3} \quad (19)$$

where $V_{21}$(off) is the value of the voltage offset of the first op-amp A1 which appears in the bandgap voltage reference $V_{ref}$.

The input voltage offset $V_{off}$ of the second op-amp A2 is reflected into the bandgap voltage reference produced by the bandgap voltage reference circuit 1 of FIG. 4 as:

$$V_{22}(off) = V_{off}\left(1 + \frac{r4}{r3}\right) \quad (20)$$

where $V_{22}$(Off) is the value of the voltage offset resulting from the second op-amp A2 which appear in the bandgap voltage reference $V_{ref}$.

If the voltage offsets $V_{21}$(off) and $V_{22}$(off) appearing in the bandgap voltage reference of the bandgap voltage reference circuit 1 of FIG. 4 resulting from the first and second op-amps A1 and A2 are to be equal, then from equations (19) and (20), the following equation must hold:

$$\frac{r2}{r1}\frac{r4}{r3} = 1 \quad (21)$$

Since one base-emitter voltage difference $\Delta V_{be}$ is equal to approximately 100 millivolts, and since the value of the output PTAT voltage developed across the output resistor r4, which is to be added to the first base-emitter CTAT voltage on the inverting input of the second op-amp A2 should be of the order of 400 millivolts, from equation (17) by setting the resistances r1 and r2 of the first and second resistors r1 and r2, respectively, equal to each other, and also by setting the resistances r3 and r4 of the primary and output resistors r3 and r4, respectively, also equal to each other, the PTAT voltage developed across the output resistor r4 is equal to four base-emitter voltage differences, namely, $4\Delta V_{be}$, which is approximately 400 millivolts.

The compound voltage offset of the op-amps A1 and A2 reflected into the voltage reference $V_{ref}$ produced by the bandgap voltage reference circuit 1 of FIG. 4 is:

$$V_{ref}(\text{off}) = \sqrt{V_{21}(\text{off})^2 + V_{22}(\text{off})^2} = 2\sqrt{2}V_{off} \quad (22)$$

Since r1=r2 and r3=r4, then $V_{21}$(off)=2V(off) and V22 (off)=2V(off).

From equations (18) and (22) it can be shown that the effect of op-amp voltage offsets in the bandgap voltage reference produced by the bandgap voltage reference circuit 1 of FIG. 4 is reduced by a factor of approximately 1.77 over the effect of the op-amp voltage offset in the bandgap voltage reference produced by the prior art bandgap voltage reference circuit of FIG. 2.

In order to confirm the significant improvements achieved by the bandgap voltage reference circuit according to the invention over the prior art bandgap voltage reference circuit of FIG. 2 in reducing the effect of op-amp voltage offsets in the bandgap voltage reference, a computer simulation of the prior art circuit of FIG. 2 was made, and a computer simulation of the bandgap voltage reference circuit of FIG.

4 was made. The computer simulations were made in similar conditions. The bipolar transistors of the bandgap voltage reference circuit of FIG. 2 were of the same size as the corresponding bipolar transistors of the bandgap voltage reference circuit 1 of FIG. 4. Similarly, the bipolar transistors of the respective bandgap voltage reference circuits of FIGS. 2 and 4 were forward biased with similar forward biasing currents. The op-amps of the respective bandgap reference circuits of FIGS. 2 and 4 were assumed to have similar input voltage offsets, each of 1 millivolt.

In the bandgap voltage reference circuit of FIG. 2, the 1 millivolt input voltage offset of the op-amp translated into a 4.5 millivolt offset in the bandgap voltage reference. However, in the bandgap voltage reference circuit 1 of FIG. 4 the 1 millivolt input voltage offset of the first op-amp A1 translated into a 1.67 millivolt offset in the bandgap voltage reference, and the 1 millivolt input voltage offset of the second op-amp A2 translated into a 2 millivolt offset in the bandgap voltage reference. The corresponding compound effect of the voltage offsets of the first and second op-amps A1 and A2 in the bandgap voltage reference produced by the bandgap voltage reference circuit 1 of FIG. 4 was 2.6 millivolts. Accordingly, the effect of the op-amp voltage offset in the bandgap voltage reference produced by the bandgap voltage reference circuit 1 of FIG. 4 was reduced by a factor of approximately 1.76 from the effect of the op-amp voltage offset in the bandgap voltage reference produced by the prior art bandgap voltage reference circuit of FIG. 2. The factor of 1.76 is very close to the theoretical value of 1.77 computed from equation (22).

Figure 6:
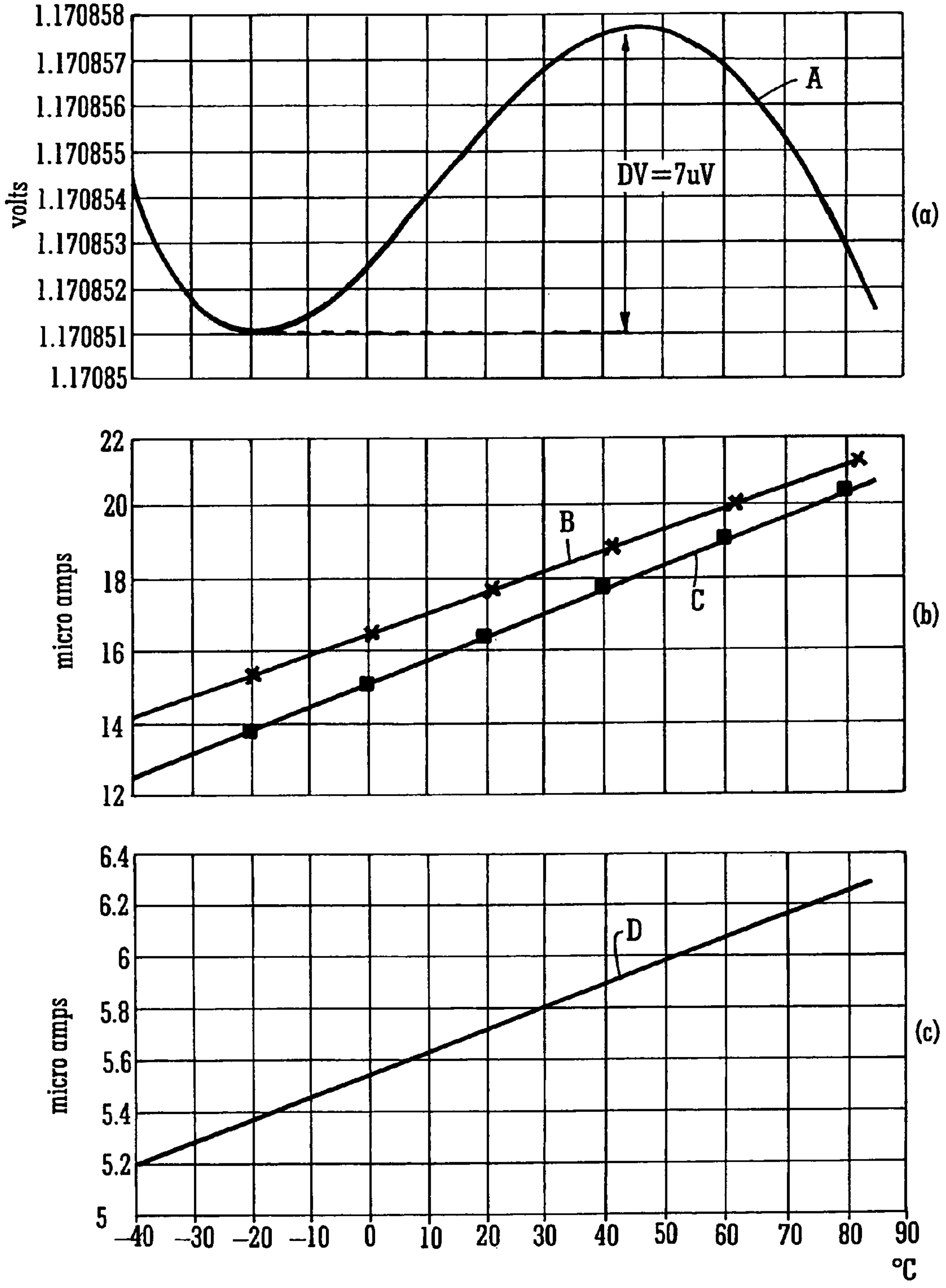

Referring now to FIGS. 6(*a*) to 6(*c*), the results of the simulation of the bandgap voltage reference circuit 1 of FIGS. 4 and 5 according to the invention are illustrated. FIG. 6(*a*) illustrates a waveform A which represents the bandgap voltage reference produced by the bandgap voltage reference circuit 1 of FIGS. 4 and 5 over a normal industrial temperature range of −40° C. to +85° C. However, in this simulation, correction for TlnT temperature curvature correction was made in the bandgap voltage reference. The temperature curvature correction was achieved by including a CTAT current component in the forward biasing PTAT currents I3 and I4 of the second transistors Q3 and Q4. Such TlnT temperature curvature correction is described in detail in co-pending U.S. patent application Ser. No. 10/375,593 of Stefan Marinca. The temperature in ° C. is plotted on the X-axis of FIGS. 6(*a*) to 6(*c*), while the voltage in volts is plotted on the Y-axis of FIGS. 6(*a*) to 6(*c*). As can be seen, the bandgap voltage reference is produced with a negligible residual temperature curvature deviation, which is approximately 7 microvolts. This temperature deviation in the bandgap voltage reference over the industrial temperature range of −40° C. to 85° C. corresponds to a temperature coefficient of approximately 0.05 parts per million per ° C. The bandgap voltage reference represented by the waveform A was prepared with the bipolar transistors properly forward biased. However, the bandgap voltage reference was produced in the simulation on the assumption that non-ideal factors, such as process dependent second and third order factors, which would otherwise affect the bandgap voltage reference were absent.

FIGS. 6(*b*) and 6(*c*) illustrate waveforms B, C and D. The waveform B represents each of the forward biasing current I1 and I2 with which the first transistors Q1 and Q2, respectively, were forward biased over the temperature range of −40° C. to +85° C. The waveform C represents the PTAT current $I_{r1}$, which forward biased the third transistor Q5 over the temperature range of −40° C. to +85° C., while the waveform D represents each of the forward biasing currents I3 and I4 with which the second transistors Q3 and Q4, respectively, were forward biased over the temperature range of −40° C. to +85° C. In FIGS. 6(*b*) and 6(*c*) temperature is plotted in ° C. on the X-axis and the current in microamps is plotted on the Y-axis. As can be seen, the forward biasing currents I1 and I2 increased linearly from approximately 14 microamps to 21 microamps over the temperature range of −40° C. to +85° C., while the current $I_r$ which forward biased the third transistor Q5 increased linearly from approximately 12.5 microamps to approximately 20.5 microamps over the temperature range of −40° C. to +80° C. The forward biasing currents I3 and I4 increased linearly from approximately 5.2 microamps to 6.3 microamps over the temperature range of −40° C. to +85° C.

Figure 7:
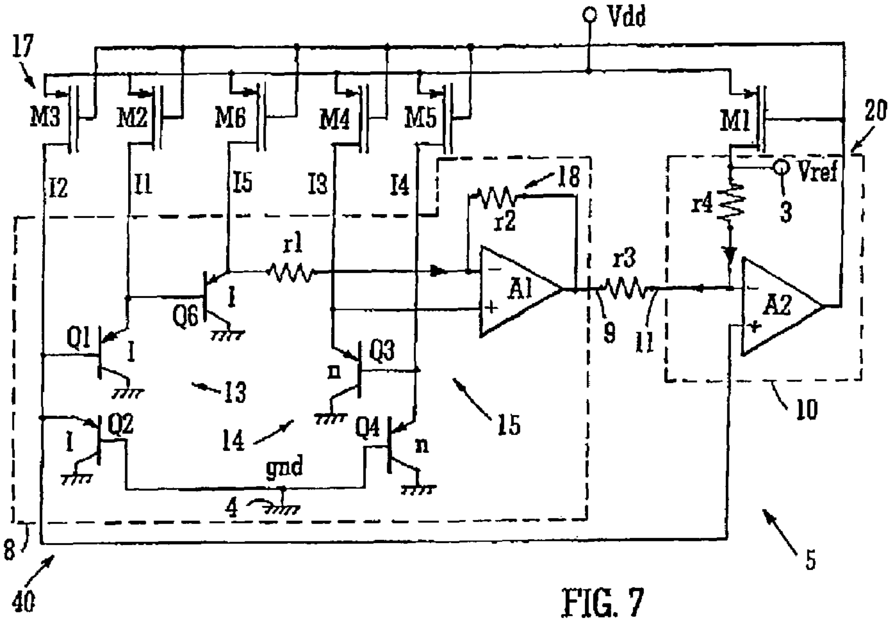
FIG. 7 is a circuit diagram of a bandgap voltage reference circuit according to another embodiment of the invention, FIGS. 8(*a*) to (*c*) illustrate waveforms of voltages and currents developed in the bandgap voltage reference circuit of FIG. 7.

Referring now to FIG. 7, there is illustrated a bandgap voltage reference circuit according to another embodiment of the invention, indicated generally by the reference numeral 40. The bandgap voltage reference circuit 40 is substantially similar to the bandgap voltage reference circuit 1, and similar components are identified by the same reference numerals and letters. The main difference between the bandgap voltage reference circuit 40 and the bandgap voltage reference circuit 1 is that the third transistor Q5 has been omitted from the feedback loop 18 of the first op-amp A1. However, in this embodiment of the invention the first transistor stack 13 is provided with one first transistor more than the number of second transistors in the second transistor stack 14. The extra first transistor is identified as the first transistor Q6, and develops a first base-emitter voltage. Accordingly, in this embodiment of the invention three first base-emitter voltages are developed in the first transistor stack 13, while two second base-emitter voltages are developed in the second transistor stack 14.

As in the bandgap voltage reference circuit 1 of FIG. 4, the first transistors Q1, Q2 and Q6 and the second transistors Q3 and Q4 are substrate bipolar transistors, and the emitter areas of the second transistors Q3 and Q4 are similar, and are each n times the area of each of the first transistors Q1, Q2 and Q6, which are each assumed to be of unit emitter area. The first transistor Q6 is forward biased by a PTAT current I5, which is of similar value to the PTAT forward biasing currents I1 to I4, which are similar to each other. The forward biasing current I5 is derived from the current mirror circuit 5 through a PMOS transistor M6.

The base-emitter voltage difference developed across the first resistor r1 is $V_{r1}$, and in this embodiment of the invention is given by the equation:

$$V_{r1}=3V_{be}(1)-2V_{be}(n) \tag{23}$$

Equation (23) can be rewritten as:

$$V_{r1}=V_{be}(1)+2\Delta V_{be} \tag{24}$$

Accordingly, the voltage $V_{O1}$ at the output of the first op-amp A1, which is the first voltage level, and which is applied to the first end 9 of the primary resistor r3, is given by the equation:

$$V_{O1}=2V_{be}(n)-[V_{be}(1)+2\Delta V_{be}]\frac{r2}{r1} \tag{25}$$

The second voltage level which is applied to the second end 11 of the primary resistor r3 is one first base-emitter voltage, which is derived from the first transistor Q2 of the first transistor stack. Therefore, the voltage $V_{r3}$ developed across the primary resistor r3 is given by the equation:

$$V_{r3} = V_{be}(1) - \left\{2V_{be}(n) - [V_{be}(1) + 2\Delta V_{be}], \frac{r2}{r1}\right\} \quad (26)$$

Equation (26) can be rewritten as:

$$V_{r3} = V_{be}(1)\frac{r2}{r1} - V_{be}(1) + 2\Delta V_{be}\left(1 + \frac{r2}{r1}\right) \quad (27)$$

Thus, the current $I_{r3}$ through the primary resistor r3 is given by the equation:

$$I_{r3} = \left\{V_{be}(1)\left(\frac{r2}{r1} - 1\right) + 2\Delta V_{be}\left(1 + \frac{r2}{r1}\right)\right\} \cdot \frac{1}{r3} \quad (28)$$

The inverting and non-inverting inputs of the op-amp A2 are high impedance inputs, and thus the current $I_{r4}$ flowing through the output resistor r4 is the same as the current $I_{r3}$ flowing through the primary resistor r3, as has already been described with reference to the bandgap voltage reference circuit 1 of FIG. 4. Therefore, the output PTAT voltage $V_{r4}$ developed across the output resistor r4 is given by the equation:

$$V_{r4} = \left\{V_{be}(1)\left(\frac{r2}{r1} - 1\right) + 2\Delta V_{be}\left(1 + \frac{r2}{r1}\right)\right\} \cdot \frac{r4}{r3} \quad (29)$$

which is the voltage developed across the primary resistor r3 gained up by the ratio of the resistance r4 of the output resistor r4 to the resistance r3 of the primary resistor r3, and reflected onto the output resistor r4.

The bandgap voltage reference $V_{ref}$ is given by the equation:

$$V_{ref} = V_{be}(1) + V_{r4} \quad (30)$$

Substituting for $V_{r4}$ in equation (30) from equation (29) gives:

$$V_{ref} = V_{be}(1)\left[1 - \frac{r4}{r3} + \frac{r2}{r1}\frac{r4}{r3}\right] + 2\Delta V_{be}\left(1 + \frac{r2}{r1}\right)\frac{r4}{r3} \quad (31)$$

In this embodiment of the invention the voltage developed across the primary resistor r3 has a non-PTAT component along with the PTAT component. The non-PTAT component is given by the term $$V_{be}(1)\left[\frac{r2}{r1} - 1\right].$$

However, the PTAT component of the voltage developed across the primary resistor r3 of the bandgap voltage reference circuit 40 is identical to the PTAT component developed across the primary resistor r3 of the bandgap voltage reference circuit 1. In this case, the M second base-emitter voltages of the first voltage level are derived from the two second transistors Q3 and Q4 of the second transistor stack 14. The P first base-emitter voltage of the second voltage level is derived from the first transistor Q2 of the first transistor stack. However, in this case, all the N first base-emitter voltages of the first voltage level are derived from the three first transistors, namely, the transistors Q1, Q2 and Q6 of the first transistor stack 13.

The value of the bandgap voltage reference $V_{ref}$ produced by the bandgap voltage reference circuit 40 of FIG. 7 is more flexible than that of the bandgap voltage reference produced by the bandgap voltage reference circuit 1 of FIGS. 4 and 5. In the bandgap voltage reference circuit 40 of FIG. 7, the bandgap voltage reference $V_{ref}$ can be scaled lower than 1.25 volts or 1.17 volts, and can be scaled down to a voltage reference value of 1.024 volts. Thus, the bandgap voltage reference circuit 40 of FIG. 6 is particularly suitable for use in digital to analogue converters and in analogue to digital converters, since the number 1024 is equal to $2^{10}$, and by representing the value 1024 by 1.024 volts, one Least Significant Bit (LSB) can be represented by 1 millivolt.

Figure 8:
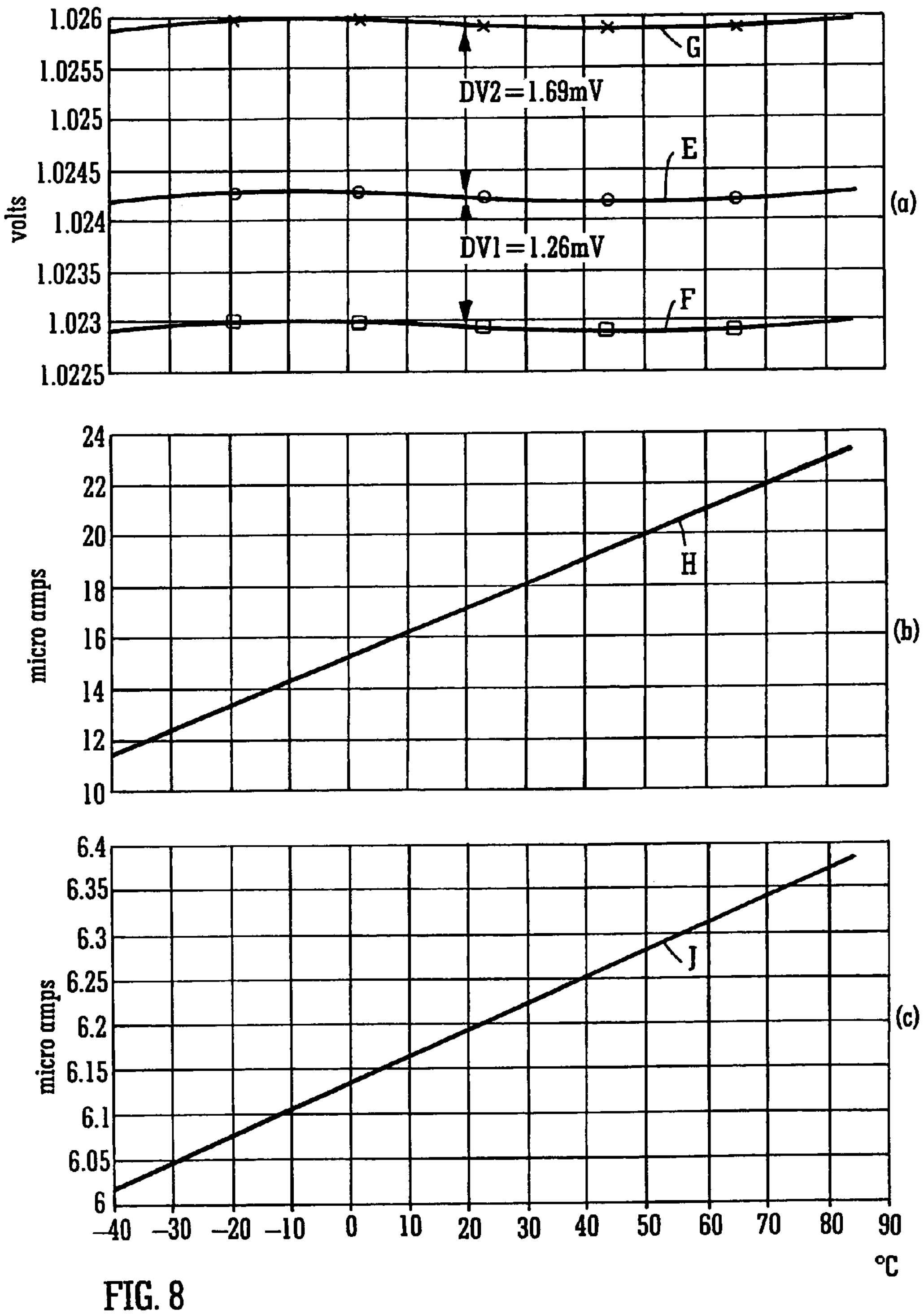

FIGS. 8(*a*) to (*c*) illustrate waveforms of three simulations which were carried out of the bandgap voltage reference circuit 40 of FIG. 7. The waveforms are illustrated over the operating temperature range of −40° C. to +85° C. which is plotted on the X-axis of FIGS. 8(*a*) to 8(*c*). In FIG. 8(*a*) the waveforms E, F and G represent three bandgap voltage references produced in the three simulations. The voltage of FIG. 8(*a*) is plotted on the Y-axis in volts. Waveform H of FIG. 8(*b*) represents each of the emitter currents I1, I2 and I5 with which the first transistors Q1, Q2 and Q6 were forward biased. Waveform J of FIG. 8(*c*) represents each of the emitter currents I3 and I4 with which the second transistors Q3 and Q4 were forward biased. The currents are plotted in FIGS. 8(*b*) and (*c*) on the Y-axis in microamps. In the simulation of the bandgap voltage reference circuit 40 the emitter areas of the first transistors Q1, Q2 and Q6 were identical to each other, and the emitter areas of the second transistors Q3 and Q4 were also identical to each other, and of ratio n times the emitter areas of the first transistor.

The forward biasing emitter currents I1, I2 and I5 with which the first transistors Q1, Q2 and Q6 were forward biased, each increased linearly over the temperature range of −40° C. to +85° C. from 11.5 mA approximately to 21 mA, see waveform H. The forward biasing emitter currents I3 and I4 with which the second transistors Q3 and Q4 were forward biased, each increased over the temperature range of −40° C. to +85° C. from approximately 6.025 mA to 6.375 mA, see waveform J of FIG. 8(*c*).

In the first simulation the first and second op-amps A1 and A2 were assumed to have no input voltage offsets, and the simulation produced a bandgap voltage reference $V_{ref}$ on the output terminal 3 represented by the waveform E of FIG. 8(*a*). As can be seen, the bandgap voltage reference $V_{ref}$ had a value of approximately 1.0245 volts. In the second simulation the first op-amp A1 was assumed to have an input voltage offset of approximately 1 millivolt, and the second op-amp A2 was assumed to have no input voltage offset. The simulation produced a bandgap voltage reference represented by the waveform F of FIG. 8(*a*) with a voltage of approximately 1.023 volts. In the third simulation the second op-amp A2 was assumed to have an input voltage offset of approximately 1 millivolt, and the first op-amp was assumed to have no input voltage offset. The simulation produced a bandgap voltage reference $V_{ref}$ represented by the waveform G of FIG. 8(*a*) of approximately 1.026 volts. Thus, the voltage offset of 1 millivolt of the first op-amp was reflected as a 1.26 millivolts offset into the bandgap reference voltage $V_{ref}$, and the voltage offset of 1 millivolt of the second op-amp A2 was reflected as a 1.69 millivolts offset into the bandgap voltage reference $V_{ref}$. The corresponding compound voltage offset which would have been reflected into the bandgap reference voltage if the first and second op-amps A1 and A2 were each assumed to have a 1 millivolt offset would be approximately 2.1 millivolts.

Figure 9:
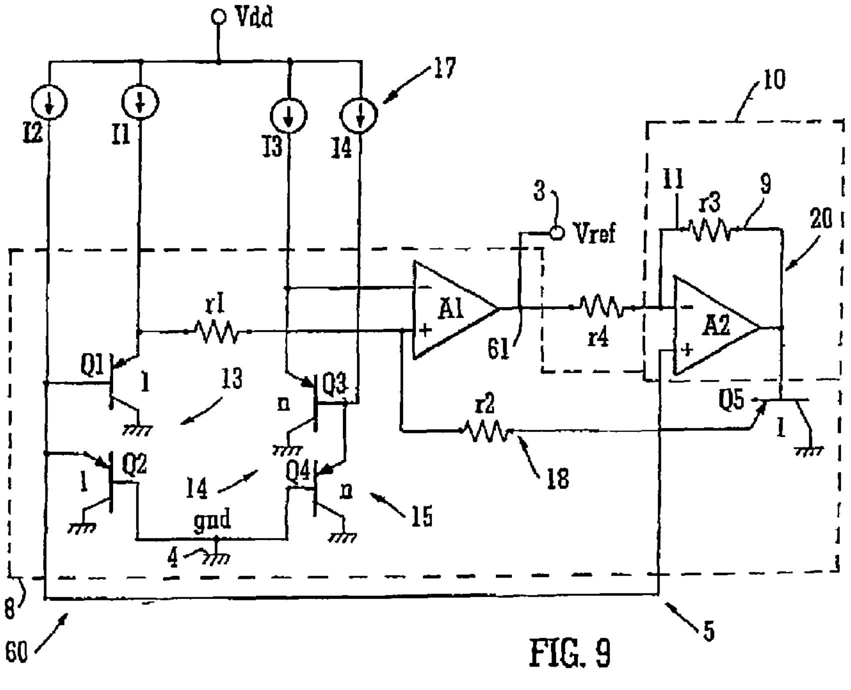
FIG. 9 is a circuit diagram of a bandgap voltage reference circuit according to a still further embodiment of the invention.

Referring now to FIG. 9, there is illustrated a bandgap voltage reference circuit according to another embodiment of the invention, indicated generally by the reference numeral 60. The bandgap voltage reference circuit 60 is somewhat similar to the bandgap voltage reference circuit 1 of FIGS. 4 and 5, and similar components are identified by the same reference numerals and letters. The main difference between the bandgap voltage reference circuit 60 and the bandgap voltage reference circuit 1 of FIGS. 4 and 5 is in the arrangement and configuration of the first and second op-amps A1 and A2, respectively, and the fact that in this embodiment of the invention the primary resistor r3 is located in the feedback loop 20 of the second op-amp A2, and the output resistor r4 is coupled between the output of the first op-amp A1 and the inverting input of the second op-amp A2. Thus, the bandgap voltage reference is produced on the output terminal 3 which is coupled to a node 61 between the output resistor r4 and the output of the first op-amp A1, and is referenced to the common ground terminal 4.

The PTAT voltage cell 15 is identical to the PTAT voltage cell 15 of the bandgap voltage reference circuit 1 of FIGS. 4 and 5, and comprises a first transistor stack 13 having two first transistors Q1 and Q2 and a second transistor stack 14 having two second transistors Q3 and Q4 which are identical to the first and second transistors Q1 and Q2, and Q3 and Q4, respectively of the PTAT cell 15 of the bandgap voltage reference circuit 1. The first and second transistors Q1 to Q4 are forward biased by forward biasing the PTAT currents I1 to I4, which are similar to the forward biasing PTAT currents I1 to I4 of the bandgap voltage reference circuit 1. The forward biasing currents 11 to 14 are derived from a current mirror circuit 17, which may derive a PTAT current from the bandgap voltage reference circuit 60 or from an external source.

The first resistor r1 across which the base-emitter voltage difference $2\Delta V_{be}$ of the first and second base-emitter voltages developed by the first and second transistors Q1 to Q4 is coupled to the non-inverting input of the first op-amp A1, and the inverting input of the first op-amp A1 is coupled to the uppermost second transistor Q3 of the second transistor stack 14. The first end 9 of the primary resistor r3 is coupled to the output of the second op-amp A2, and the first voltage level relative to the common ground voltage terminal 4 is applied to the first end 9 of the primary resistor r3 through the second resistor r2 and a third transistor Q5, which is similar to the third transistor Q5 of the bandgap voltage reference circuit 1 of FIGS. 4 and 5, and develops a first base-emitter voltage.

The second voltage level relative to the common ground voltage terminal 4, which in this embodiment of the invention is also one first base-emitter voltage which is derived from the first transistor Q2 of the first transistor stack 13, is applied to the non-inverting input of the second op-amp A2, and in turn is applied to the second end 11 of the primary resistor r3 as the second op-amp A2 operates to maintain its inverting input at the same voltage as its non-inverting input. The inverting and non-inverting inputs of the second op-amp A2 are high impedance inputs, and thus the current flowing through the output resistor r4 is the same as the current flowing through the primary resistor r3, therefore the voltage developed across the primary resistor r3 is reflected across the output resistor r4, and gained up by the ratio of the resistance r4 of the output resistor r4 to the resistance r3 of the primary resistor r3 to form the output PTAT voltage across the output resistor r4. The PTAT voltage developed across the output resistor r4 is in turn summed with the first base-emitter CTAT voltage, which is derived from the first transistor Q2, and which is applied to the non-inverting input of the second op-amp A2 to provide the bandgap voltage reference on the output terminal 3 referenced to the common ground terminal 4.

The following is an explanation of how the PTAT voltage is developed across the primary resistor r3, and in turn is gained up and reflected across the output resistor r4 to provide the output PTAT voltage for summing with the CTAT voltage to produce the bandgap voltage reference.

The PTAT voltage $V_{r1}$ developed across the first resistor r1 of the bandgap reference circuit 60 is given by the equation:

$$V_{r1}=2\Delta V_{be} \tag{32}$$

The current $I_{r1}$ through the first resistor r1 is a PTAT current, and is given by the equation:

$$I_{r1}=\frac{2\Delta V_{be}}{r1} \tag{33}$$

For the same reason as described with reference to the bandgap voltage reference circuit 1 of FIGS. 4 and 5, the current $I_{r2}$ through the second resistor r2 is equal to the current $I_{r1}$. Accordingly, the voltage $V_{r2}$ developed across the second resistor r2 is equal to:

$$V_{r2}=\frac{2\Delta V_{be}}{r1}r2 \tag{34}$$

The voltage $V_{O2}$ at the output of the second op-amp A2 which is the first voltage level and is applied to the first end 9 of the primary resistor r3 is given by the following equation:

$$V_{O2}=2V_{be}(n)-2\Delta V_{be}\frac{r2}{r1}-V_{be}(1) \tag{35}$$

The first voltage level as discussed above which is applied to the second end 11 of the primary resistor r3 is the first base-emitter voltage derived from the first transistor Q2. Accordingly, the voltage developed across the primary resistor r3 is given by the following equation:

$$V_{r3}=V_{be}(1)-V_{o2} \tag{36}$$

Substituting for $V_{O2}$ in equation (36) from equation (35) gives:

$$V_{r3}=V_{be}(1)-2V_{be}(n)+2\Delta V_{be}\frac{r2}{r1}+V_{be}(1) \tag{37}$$

Equation (37) can be rewritten as follows:

$$V_{r3} = 2\Delta V_{be}\left(1 + \frac{r2}{r1}\right) \quad (38)$$

Therefore, the voltage developed across the primary resistor r3 is a pure PTAT voltage, which is similar to the PTAT voltage developed across the primary resistor r3 of the bandgap voltage reference circuit 1 of FIGS. 4 and 5.

The current flowing through the primary resistor r3 is given by the equation:

$$I_{r3} = 2\Delta V_{be}\left[1 + \frac{r2}{r1}\right]\frac{1}{r3} \quad (39)$$

Since for reasons explained above the current $I_{r4}$ flowing through the output resistor r4 is the same as the current $I_{r3}$ flowing through the primary resistor r3, the output voltage $V_{r4}$ developed across the output resistor r4 is given by the following equation:

$$V_{r4} = 2\Delta V_{be}\left[1 + \frac{r2}{r1}\right]\frac{r4}{r3} \quad (40)$$

Accordingly, in this embodiment of the invention the PTAT voltage developed across the primary resistor r3 is reflected onto the output resistor r4 and is gained up by the resistance r4 of the output resistor r4 to the resistance r3 of the primary resistor r3, and is thus a pure PTAT voltage similar to the output PTAT voltage developed across the output resistor r4 of the bandgap voltage reference circuit 1 of FIGS. 4 and 5.

The bandgap voltage reference $V_{ref}$ on the output terminal 3 is given by the following equation:

$$V_{ref}=V_{be}(1)+V_{r4} \quad (41)$$

Substituting for $V_{r4}$ from equation (40) in equation (41) gives:

$$V_{ref} = V_{be}(1) + 2\Delta V_{be}\left(1 + \frac{r2}{r1}\right)\frac{r4}{r3} \quad (42)$$

which is similar to the bandgap voltage reference produced by the bandgap voltage reference circuit 1 of FIGS. 4 and 5.

Accordingly, in this embodiment of the invention the N first base-emitter voltages of the first voltage level are derived from the first transistors Q1 and Q2 in the first transistor stack 13 and the third transistor Q5. The M base-emitter voltages of the first voltage level are derived from the second transistors Q3 and Q4 of the second transistor stack 14. The P base-emitter voltage of the second voltage level is derived from the first transistor Q2 of the first transistor stack 13.

Figure 10:
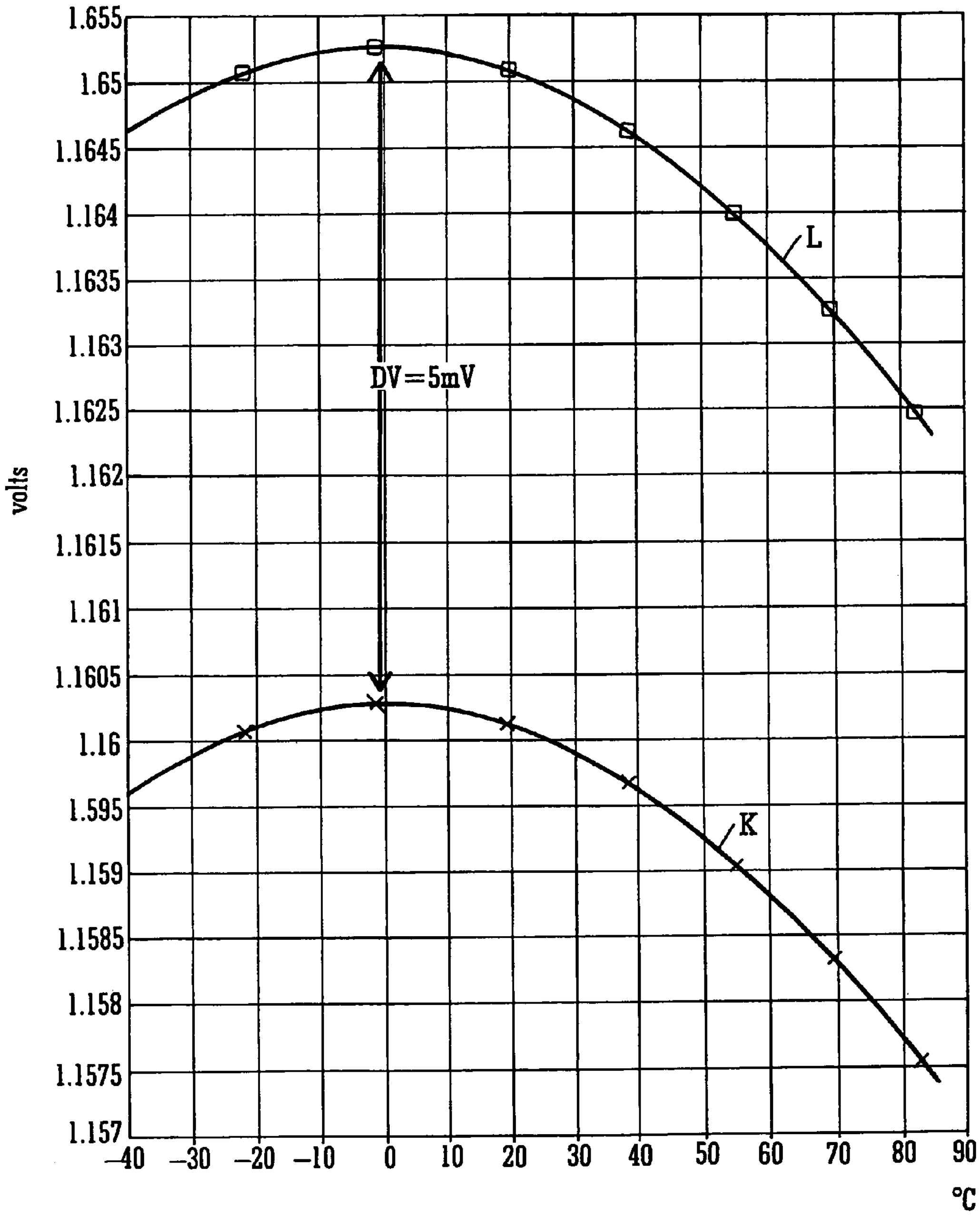
FIG. 10 illustrates waveforms of voltage references developed in a simulation of the bandgap voltage reference circuit of FIG. 2 for the purpose of comparative analysis with the bandgap voltage reference circuit of FIG. 9.
Figure 11:
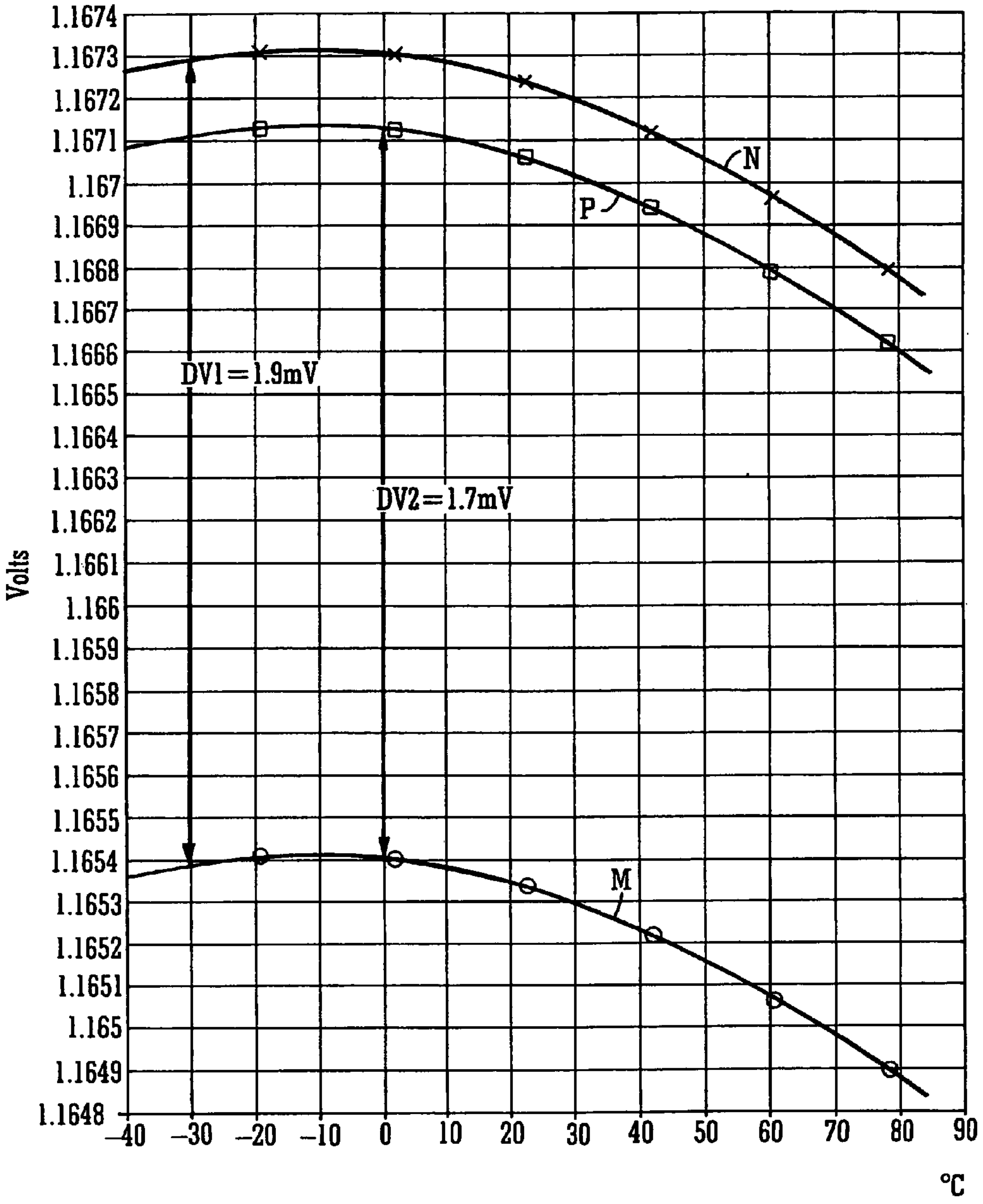
FIG. 11 illustrates waveforms of voltage references developed in a simulation of the bandgap voltage reference circuit of FIG. 9.

Referring now to FIGS. 10 and 11, in order to compare the sensitivity of the bandgap voltage reference $V_{ref}$ produced by the bandgap voltage reference circuit 60 of FIG. 9 to input voltage offsets of the first and second op-amps A1 and A2 with the sensitivity to op-amp input voltage offset of the bandgap voltage reference produced by the prior art bandgap voltage reference circuit of FIG. 2, two simulations of the prior art bandgap voltage reference circuit of FIG. 2 were made, and three simulations of the bandgap voltage reference circuit 60 of FIG. 9 were made. In the first simulation of the prior art bandgap voltage reference circuit of FIG. 2, the op-amp was assumed to have no input voltage offset, and in the second simulation the op-amp was assumed to have an input voltage offset of 1 millivolt. Waveforms K and L of FIG. 10 represent the voltage reference produced by the two simulations of the prior art bandgap voltage reference circuit of FIG. 2 over the operating temperature range of −40° C. to +85° C. The temperature is plotted on the X-axis in ° C., and the voltage is plotted on the Y-axis in volts. The waveform K represents the bandgap voltage reference with the op-amp having no input voltage offset. The waveform L represents the bandgap voltage reference with the op-amp having an input voltage offset error of 1 millivolt. As can be seen, the 1 millivolt input voltage offset error of the op-amp is reflected as 5 millivolts into the bandgap voltage reference of the waveform L.

In the first simulation of the bandgap voltage reference circuit 60 of FIG. 9 the first and second op-amps A1 and A2 were assumed to have no input voltage offset. In the second simulation of the bandgap voltage reference circuit 60, the first op-amp A1 was assumed to have a 1 millivolt input voltage offset, and the second op-amp A2 was assumed to have no input voltage offset. In the third simulation of the bandgap voltage reference circuit 60 the second op-amp A2 was assumed to have a 1 millivolt input voltage offset, and the first op-amp A1 was assumed to have no input voltage offset. The waveforms M, N and P of FIG. 11 represent the bandgap voltage references produced by the three simulations of the bandgap voltage reference circuit 60 over the operating temperature range of −40° C. to +85° C. In FIG. 11 the temperature is plotted on the X-axis in ° C., and the voltage is plotted on the Y-axis in volts. The waveform M represents the bandgap voltage reference with the first and second op-amps of the bandgap voltage reference circuit 60 having no input voltage offsets. The waveform N represents the bandgap voltage reference with the first op-amp A1 having a 1 millivolt input voltage offset, while the waveform P represents the bandgap voltage reference with the second op-amp A2 having a 1 millivolt input voltage offset.

As can be seen from FIG. 11, the input voltage offset of the first op-amp A1 is reflected into the bandgap voltage reference as 1.9 millivolts, while the 1 millivolt input voltage offset of the second op-amp A2 is reflected into the bandgap voltage reference as 1.7 millivolts. Accordingly, the compound offset voltage of the 1 millivolts input voltage offsets of the first and second op-amps A1 and A2, respectively, in the bandgap voltage reference circuit 60 of FIG. 9 is given by the equation:

$$V_{2(off)}=\sqrt{1.9^2+1.7^2}=2.55\,mV$$

Therefore, the bandgap voltage reference circuit 60 of FIG. 9 is approximately two times less sensitive to input voltage offsets of the op-amps A1 and A2 than is the prior art bandgap voltage reference of the bandgap voltage reference circuit of FIG. 2 to input voltage offsets of the op-amp of the prior art circuit of FIG. 2.

Additionally, the bandgap voltage reference circuits 1, 40 and 60 of FIGS. 4, 5, 7 and 9, respectively, can comfortably operate with a supply voltage of the order of 2.5 volts to 2.7 volts, and are thus particularly suitable for implementation in low voltage CMOS environments. The common input voltage on the inverting and non-inverting inputs of the first op-amps A1 of the circuits 1, 40 and 60 is two second base-emitter voltages above the common ground terminal 4. In other words, at −40° C. the common input voltage on the first op-amps A1 of the circuits 1, 40 and 60 is approximately 1.6 volts above the common ground terminal 4. Accordingly, the first op-amps A1 can be provided with pMOS input pairs, since the supply voltage required by pMOS input pairs is approximately 0.8 volts above the common input voltage. At a common input voltage of 1.6 volts, allowing for the additional 0.8 volts by which the supply voltage of pMOS input pairs must be above the common input voltage of 1.6 volts, a supply voltage of 2.4 volts would be required for the first op-amps A1 of the bandgap voltage reference circuits 1, 40 and 60, which is well within the supply voltage of 2.5 volts to 2.7 volts of low voltage CMOS environments. Additionally, since the second op-amps of the bandgap voltage reference circuits 1, 40 and 60 of FIGS. 4, 5, 7 and 9 operate with a common input voltage of one first base-emitter voltage above the common ground terminal 4, the second op-amps A2 can also be provided with pMOS input pairs and operate well within the supply voltage of 2.5 volts to 2.7 volts of low voltage CMOS environments.

While the bandgap voltage reference circuits 1 and 60 of FIGS. 4, 5 and 9 have been described as comprising a first transistor stack and a second transistor stack, of two first transistors and two second transistors, respectively, and while the bandgap voltage reference circuit 40 of FIG. 7 has been described as comprising three first transistors in the first transistor stack and two second transistors in the second transistor stack, the PTAT voltage cells may be provided with any number of first and second transistors in the respective first and second transistor stacks from one first transistor, and one second transistor, upwards. However, the more transistors which are stacked in the respective first and second transistor stacks, the greater will be the PTAT voltage ultimately developed. However, the headroom required by the bandgap voltage reference increases for each transistor included in a transistor stack. Thus, for low voltage applications, such as, for low voltage CMOS applications, two second transistors in a second transistor stack, and two or three first transistors in a first transistor stack is optimum. Additionally, the second voltage level which is applied to the second end of the primary resistor r3 must be at least one first base-emitter voltage, but may be more than one first base-emitter voltage. However, the greater the number of first base-emitter voltages provided in the second voltage level, the higher will be the headroom required by the bandgap voltage reference circuit.

If the second voltage level was provided by two base-emitter voltages in the bandgap voltage reference circuit 1 of FIG. 4 and the bandgap voltage reference circuit 60 of FIG. 9, the third transistor which is coupled between the second resistor and the first end of the primary resistor r3 would not be required, and thus, could be omitted.

Where the number of first and second transistors in the respective first and second transistor stacks of the PTAT cell are similar, the number of third transistors coupling the second resistor r2 to the first end of the primary resistor r3 will depend on the number of first base-emitter voltages in the second voltage level applied to the second end of the primary resistor r3, and the number of second transistors in the second transistor stack. In order to provide a pure PTAT voltage across the primary resistor r3, the sum of the number of first base-emitter voltages in the second voltage level plus the sum of the number of first base-emitter voltages provided in the feedback loop through which the second resistor r2 is coupled to the first end of the primary resistor r3 should be equal to the number of second transistors in the second transistor stack of the PTAT voltage cell.

Where all N first base-emitter voltages of the first voltage level are derived from the first transistor stack, the number of first base-emitter voltages developed in the first transistor stack should be greater than the number of second base-emitter voltages developed in the second transistor stack by an amount equal to the number P of first base-emitter voltages provided in the second voltage level.

Additionally, while the first base-emitter voltages of the second voltage level have been described as being derived from the first base-emitter voltages developed by the first transistors, the first base-emitter voltages of the second voltage level may be derived from any other suitable transistor or transistors capable of providing base-emitter voltages corresponding to the first base-emitter voltages of the first transistors in the first transistor stack. Where more than one first base-emitter voltage is required in the feedback loop of the first op-amp for coupling the second resistor to the first end of the primary resistor, the number of first base-emitter voltages may be obtained from any suitable number of transistors. Needless to say, the first and second base-emitter voltages of the PTAT cell may likewise be obtained from any suitable number of first and second transistors.

It is envisaged that each single transistor may be implemented as a plurality of transistors the base-emitters of which would be connected in parallel. For example, where the bandgap voltage reference circuit is implemented in a CMOS process, each transistor may be implemented as a plurality of bipolar substrate transistors each of unit area, and the area of each of the first and second transistors would be determined by the number of bipolar substrate transistors of unit area connected with their respective base-emitters in parallel. Similarly, where the bandgap voltage reference circuits according to the invention are implemented in a CMOS process, the third transistors could also typically be provided by a plurality of bipolar substrate transistors of unit area, and each third transistor would be provided by the appropriate number of transistors of unit area connected with their base and emitters in parallel to provide the appropriate emitter area.

In general, where the bandgap voltage reference circuits according to the invention are implemented in a CMOS process, the transistors will be bipolar substrate transistors, and the collectors of the transistors will be held at ground, although the collectors of the transistors may be held at a reference voltage other than ground.

Additionally, it will be appreciated that while the CTAT voltage which is added to the output PTAT voltage developed across the output resistor r4 has been derived from one of the first transistors in the first transistor stack in the bandgap voltage reference circuits of FIGS. 4, 5, 7 and 8, it will be appreciated that the CTAT voltage to be summed with the output PTAT voltage developed across the output resistor r4 may be derived from any other suitable transistor.

While the bandgap voltage reference of the bandgap voltage reference circuits 1, 40 and 60 have been described for producing a bandgap voltage reference without TlnT temperature correction, it is envisaged that the bandgap voltage reference circuits according to the invention may include TlnT temperature curvature correction to produce a bandgap voltage reference with TlnT temperature curvature correction. It is envisaged that TlnT temperature curvature correction could be provided by forward biasing one or both of the second transistors Q3 and Q4 with a forward biasing current comprising a PTAT current component and a CTAT current component. The introduction of a CTAT current component into the PTAT forward biasing current or currents of either one or both of the second transistors Q3 and Q4 would cause the base-emitter CTAT voltages developed by the relevant second transistors to be developed with a curvature complementary to an uncorrected CTAT voltage with TlnT temperature curvature, and the complementary TlnT temperature curvature would be reflected in the output PTAT voltage developed across the first resistor r1. Accordingly, when the amplified PTAT voltage with the complementary TlnT temperature correction would be summed with an uncorrected CTAT base-emitter voltage, the complementary TlnT temperature curvature would cancel out the TlnT temperature curvature of the CTAT voltage.

While in the embodiment of the invention described with reference to FIGS. 4 and 5 the currents I1, I2, I3 and I4 which are provided for biasing the first transistors Q1 and Q2, and the second transistors Q3 and Q4, respectively have been described as identical currents, it will be readily apparent to those skilled in the art that while the currents I1 and I2 should preferably be identical to each other, and the currents I3 and I4 should likewise preferably be identical to each other, the currents I1 and I2 could be greater than the currents I3 and I4, for further increasing the ratio of the current densities at which the first transistors Q1 and Q2 are operating relative to the current densities at which the second transistors Q3 and Q4 are operating for further increasing the value of the base-emitter voltage difference to $\Delta V_{be}$. Similarly, in the embodiment of the invention described with reference to FIG. 7, the currents I1, I2 and I5, while being identical to each other could be greater than the currents I3 and I4, which likewise would be identical to each other. Similar comments apply to the embodiment of the invention described with reference to FIG. 9 as apply to the embodiment of the invention described with reference to FIGS. 4 and 5 insofar as the currents I1, I2, I3 and I4 are concerned.

While a number of preferred bandgap voltage reference circuits have been described, the invention is not to be considered as to be limited to such circuits, and the invention is only limited by the scope of the claims.

The invention claimed is:

1. A PTAT voltage generating circuit comprising:

a primary impedance element across which a PTAT voltage is developed, a first circuit for generating a first voltage level for applying to a first end of the primary impedance element, the first voltage level being provided as a function of the difference of N first base-emitter voltages and M second base-emitter voltages, N and M being integer values greater than zero and being of values different to each other, the first circuit comprising a first transistor stack having at least one first transistor for providing at least one of the N first base-emitter voltages, and a second transistor stack having at least one second transistor for providing at least one of the M second base-emitter voltages, each first transistor being operated at a first current density, and each second transistor being operated at a second current density, the second current density being different to the first current density, a first impedance element and a first op-amp configured to operate in a closed loop mode co-operating with the first and second transistor stacks so that a voltage difference of the first and second base-emitter voltages in the respective first and second transistor stacks is developed across the first impedance element for providing at least a part of the first voltage level, and a second circuit for generating a second voltage level for applying to a second end of the primary impedance element, the second voltage level being provided as a function of P of said N first base-emitter voltages, where P is an integer value greater than zero, the second circuit comprising a second op-amp configured to operate in a closed loop mode and co-operating with the first transistor stack for producing the P of said N first base-emitter voltages, the second circuit co-operating with the first circuit and with the primary impedance element so that the voltage developed across the primary impedance element by the difference of the first and second voltage levels comprises said PTAT voltage.

2. A PTAT voltage generating circuit as claimed in claim 1 in which the first impedance element is coupled between one of the inverting and non-inverting inputs of the first op-amp and one of the first and second transistor stacks, and the other of the inverting and non-inverting inputs of the first op-amp is coupled to the other one of the first and second transistor stacks.

3. A PTAT voltage generating circuit as claimed in claim 2 in which a second impedance element is coupled to the one of the inverting and non-inverting inputs of the first op-amp to which the first impedance element is coupled for setting the closed loop gain of the first op-amp, and the voltage difference developed across the first impedance element is reflected onto the second impedance element, the second impedance element being coupled to the first end of the primary impedance element for applying the first voltage level to the first end of the primary impedance element.

4. A PTAT voltage generating circuit as claimed in claim 3 in which the first op-amp co-operates with the second transistor stack for combining at least one of the second base-emitter voltages with the voltage developed across the second impedance element for producing the first voltage level.

5. A PTAT voltage generating circuit as claimed in claim 3 in which the second impedance element is coupled to the first end of the primary impedance element through the base-emitter of at least one third transistor, each third transistor developing a first base-emitter voltage for combining with the voltage developed across the second impedance element for producing the first voltage level.

6. A PTAT voltage generating circuit as claimed in claim 5 in which the number of first base-emitter voltages developed in the first voltage level by the third transistors is equal to the number P of first base-emitter voltages in the second voltage level.

7. A PTAT generating circuit as claimed in claim 4 in which the number of first base-emitter voltages developed in the first transistor stack is greater than the number of second base-emitter voltages developed in the second transistor stack, the difference between the number of first base-emitter voltages developed in the first transistor stack and the number of second base-emitter voltages developed in the second transistor stack is equal to the number P of first base-emitter voltages provided in the second voltage level.

8. A PTAT generating circuit as claimed in claim 3 in which the value of the first base-emitter voltages in the first voltage level derived from the first transistor stack is equal to the product of the number of first base-emitter voltages developed in the first transistor stack by the ratio of the impedance of the second impedance element to the impedance of the first impedance element, and the value of the second base-emitter voltages in the first voltage level derived from the second transistor stack is equal to the sum of the number of second base-emitter voltages developed in the second transistor stack plus the product of the number of second base-emitter voltages developed in the second transistor stack by the ratio of the impedance of the second impedance element to the impedance of the first impedance element.

9. A PTAT voltage generating circuit as claimed in claim 8 in which the M second base-emitter voltages from which the first voltage level is produced are derived from the second transistor stack.

10. A PTAT voltage generating circuit as claimed in claim 1 in which the P first base-emitter voltages from which the second voltage level is produced are applied to one of the inverting and non-inverting inputs of the second op-amp, and the second end of the primary impedance element is coupled to the other of the inverting and non-inverting inputs of the second op-amp, so that as the second op-amp operates to maintain the voltages on the respective inverting and non-inverting inputs thereof similar, the second voltage level is applied to the second end of the primary impedance element.

11. A PTAT generating circuit as claimed in claim 10 in which an output impedance element co-operates with the primary impedance element for setting the closed loop gain of the second op-amp, the voltage developed across the primary impedance element being reflected across the output impedance element by the ratio of the impedance of the output impedance element to the impedance of the primary impedance element for providing an output voltage comprising a PTAT voltage across the output impedance element.

12. A PTAT voltage generating circuit as claimed in claim 11 in which the first end of the primary impedance element is coupled to the output of one of the first and second op-amps, and the output impedance element is coupled between the one of the inverting and non-inverting inputs of the second op-amp to which the primary impedance is coupled and the output of the one of the first and second op-amps to which the primary impedance element is not coupled.

13. A PTAT voltage generating circuit as claimed in claim 12 in which the one of the primary impedance element and the output impedance element which is coupled to the output of the second op-amp is coupled to one of the inverting and non-inverting inputs of the second op-amp to provide negative feedback from the output of the second op-amp.

14. A PTAT voltage generating circuit as claimed in claim 12 in which the first end of the primary impedance element is coupled to the output of the first op-amp.

15. A PTAT voltage generating circuit as claimed in claim 12 in which the first end of the primary impedance element is coupled to the output of the second op-amp.

16. A PTAT voltage generating circuit as claimed in claim 1 in which the number of second base-emitter voltages developed in the second transistor stack is at least two second base-emitter voltages.

17. A PTAT voltage generating circuit as claimed in claim 1 in which the number of first base-emitter voltages developed in the first transistor stack is equal to or greater than the number of second base-emitter voltages developed in the second transistor stack.

18. A PTAT voltage generating circuit as claimed in claim 1 in which the first current density at which the first transistors are operated is greater than the second current density at which the second transistors are operated.

19. A PTAT voltage generating circuit as claimed in claim 1 in which the first and second voltage levels are referenced to a common ground reference voltage of the PTAT voltage generating circuit.

20. A PTAT voltage generating circuit as claimed in claim 1 in which each first and second transistor is provided by a bipolar substrate transistor.

21. A PTAT voltage generating circuit as claimed in claim 1 in which each impedance element is a resistive impedance element.

22. A PTAT voltage generating circuit as claimed in claim 1 in which the circuit is implemented in a CMOS process.

23. A bandgap voltage reference circuit for producing a bandgap voltage reference, the bandgap voltage reference circuit comprising the PTAT voltage generating circuit as claimed in claim 1 for generating a PTAT voltage for summing with a CTAT voltage, and a means for summing the PTAT voltage with the CTAT voltage for providing the bandgap voltage reference.

24. A bandgap voltage reference circuit for producing a bandgap voltage reference, the bandgap voltage reference circuit comprising:

a CTAT voltage source for developing a CTAT voltage, a PTAT voltage source for developing a PTAT voltage for summing with the CTAT voltage, the PTAT voltage source comprising:

a primary impedance element across which a PTAT voltage is developed, a first circuit for generating a first voltage level for applying to a first end of the primary impedance element, the first voltage level being provided as a function of the difference of N first base-emitter voltages and M second base-emitter voltages, N and M being integer values greater than zero and being of values different to each other, the first circuit comprising a first transistor stack having at least one first transistor for providing at least one of the N first base-emitter voltages and a second transistor stack having at least one second transistor for providing at least one of the M second base-emitter voltages each first transistor being operated at a first current density, and each second transistor being operated at a second current density, the second current density being different to the first current density, a first impedance element and a first op-amp configured to operate in a closed loop mode co-operating with the first and second transistor stacks so that a voltage difference of the first and second base-emitter voltages in the respective first and second transistor stacks is developed across the first impedance element for providing at least a part of the first voltage level, and a second circuit for generating a second voltage level for applying to a second end of the primary impedance element, the second voltage level being provided as a function of P of said N first base-emitter voltages, where P is an integer value greater than zero, the second circuit comprising a second op-amp configured to operate in a closed loop mode and co-operating with the first transistor stack for producing the P of said N first base-emitter voltages, the second circuit co-operating with the first circuit and with the primary impedance element so that the voltage developed across the primary impedance element by the difference of the first and second voltage levels comprises said PTAT voltage, and a means for summing the PTAT voltage with the CTAT voltage.

25. A bandgap voltage reference circuit as claimed in claim 24 in which the first impedance element is coupled between one of the inverting and non-inverting inputs of the first op-amp and one of the first and second transistor stacks, and the other of the inverting and non-inverting inputs of the first op-amp is coupled to the other one of the first and second transistor stacks.

26. A bandgap voltage reference circuit as claimed in claim 25 in which a second impedance element is coupled to the one of the inverting and non-inverting inputs of the first op-amp to which the first impedance element is coupled for setting the closed loop gain of the first op-amp, and the voltage difference developed across the first impedance element is reflected onto the second impedance element, the second impedance element being coupled to the first end of the primary impedance element for applying the first voltage level to the first end of the primary impedance element.

27. A bandgap voltage reference circuit as claimed in claim 26 in which the first op-amp co-operates with the second transistor stack for combining at least one of the second base-emitter voltages with the voltage developed across the second impedance element for producing the first voltage level.

28. A bandgap voltage reference circuit as claimed in claim 26 in which the second impedance element is coupled to the first end of the primary impedance element through the base-emitter of at least one third transistor, each third transistor developing a first base-emitter voltage for combining with the voltage developed across the second impedance element for producing the first voltage level.

29. A bandgap voltage reference circuit as claimed in claim 28 in which the number of first base-emitter voltages developed in the first voltage level by the third transistors is equal to the number P of first base-emitter voltages in the second voltage level.

30. A bandgap voltage reference circuit as claimed in claim 27 in which the number of first base-emitter voltages developed in the first transistor stack is greater than the number of second base-emitter voltages developed in the second transistor stack, the difference between the number of first base-emitter voltages developed in the first transistor stack and the number of second base-emitter voltages developed in the second transistor stack is equal to the number P of first base-emitter voltages provided in the second voltage level.

31. A bandgap voltage reference circuit as claimed in claim 27 in which the value of the first base-emitter voltages in the first voltage level derived from the first transistor stack is equal to the product of the number of first base-emitter voltages developed in the first transistor stack by the ratio of the impedance of the second impedance element to the impedance of the first impedance element, and the value of the second base-emitter voltages in the first voltage level derived from the second transistor stack is equal to the sum of the number of second base-emitter voltages developed in the second transistor stack plus the product of the number of second base-emitter voltages developed in the second transistor stack by the ratio of the impedance of the second impedance element to the impedance of the first impedance element.

32. A bandgap voltage reference circuit as claimed in claim 31 in which the M second base-emitter voltages from which the first voltage level is produced are derived from the second transistor stack.

33. A bandgap voltage reference circuit as claimed in claim 24 in which the P first base-emitter voltages from which the second voltage level is produced are applied to one of the inverting and non-inverting inputs of the second op-amp, and the second end of the primary impedance element is coupled to the other of the inverting and non-inverting inputs of the second op-amp, so that as the second op-amp operates to maintain the voltages on the respective inverting and non-inverting inputs thereof similar, the second voltage level is applied to the second end of the primary impedance element.

34. A bandgap voltage reference circuit as claimed in claim 33 in which an output impedance element is provided for co-operating with the primary impedance element so that the voltage developed across the primary impedance element is reflected onto the output impedance element by the ratio of the impedance of the output impedance element to the impedance of the primary impedance element for providing the PTAT voltage on the output impedance element for summing with the CTAT voltage.

35. A bandgap voltage reference circuit as claimed in claim 34 in which the output impedance element co-operates with the primary impedance element for setting the closed loop gain of the second op-amp.

36. A bandgap voltage reference circuit as claimed in claim 34 in which the P first base-emitter voltages of the second voltage level form the CTAT voltage, and the second op-amp co-operates with the output impedance for forming the summing means for summing the CTAT voltage provided by the P first base-emitter voltages with the PTAT voltage developed across the output impedance element for providing the bandgap voltage reference.

37. A bandgap voltage reference circuit as claimed in claim 36 in which the first and second voltage levels are referenced to a common ground reference voltage of the bandgap voltage reference circuit, and the bandgap voltage reference is derived from the end of the output impedance element which is coupled to the output of one of the first and second op-amps, and is referenced to the common ground voltage.

38. A bandgap voltage reference circuit as claimed in claim 34 in which the first end of the primary impedance element is coupled to the output of one of the first and second op-amps, and the output impedance element is coupled between the one of the inverting and non-inverting inputs of the second op-amp to which the primary impedance element is coupled and the output of the one of the first and second op-amps to which the primary impedance element is not coupled.

39. A bandgap voltage reference circuit as claimed in claim 38 in which the one of the primary impedance element and the output impedance element which is coupled to the output of the second op-amp is coupled to one of the inverting and non-inverting inputs of the second op-amp to provide negative feedback from the output of the second op-amp.

40. A bandgap voltage reference circuit as claimed in claim 38 in which the first end of the primary impedance element is coupled to the output of the first op-amp.

41. A bandgap voltage reference circuit as claimed in claim 38 in which the first end of the primary impedance element is coupled to the output of the second op-amp.

42. A bandgap voltage reference circuit as claimed in claim 24 in which the number of second base-emitter voltages developed in the second transistor stack is at least two second base-emitter voltages.

43. A bandgap voltage reference circuit as claimed in claim 24 in which the number of first base-emitter voltages developed in the first transistor stack is equal to or greater than the number of second base-emitter voltages developed in the second transistor stack.

44. A bandgap voltage reference circuit as claimed in claim 24 in which the first current density at which the first transistors are operated is greater than the second current density at which the second transistors are operated.

45. A bandgap voltage reference circuit as claimed in claim 24 in which the first and second voltage levels are referenced to a common ground reference voltage of the PTAT voltage generating circuit.

46. A bandgap voltage reference circuit as claimed in claim 24 in which each first and second transistor is provided by a bipolar substrate transistor.

47. A bandgap voltage reference circuit as claimed in claim 24 in which each impedance element is a resistive impedance element.

48. A bandgap voltage reference circuit as claimed in claim 24 in which the emitters of the first and second transistors of the respective first and second transistor stacks are forward biased with a PTAT current.

49. A bandgap voltage reference circuit as claimed in claim 48 in which the bandgap voltage reference is provided with TlnT temperature curvature correction.

50. A bandgap voltage reference circuit as claimed in claim 49 in which the forward biasing current of at least one of the second transistors of the second transistor stack comprises a CTAT current component for providing the TlnT temperature curvature correction of the bandgap voltage reference.

51. A method for generating a PTAT voltage across a primary impedance element, the method comprising the steps of:

applying a first voltage level to a first end of the primary impedance element, the first voltage level being provided as a function of the difference of N first base-emitter voltages and M second base-emitter voltages, N and M being integer values greater than zero and being of values different to each other, the first voltage level being produced by a first circuit comprising a first transistor stack having at least one first transistor for providing at least one of the N first base-emitter voltages, and a second transistor stack having at least one second transistor for providing at least one of the M second base-emitter voltages each first transistor being operated at a first current density, and each second transistor being operated at a second current density, the second current density being different to the first current density, a first impedance element and a first op-amp configured to operate in a closed loop mode co-operating with the first and second transistor stacks so that a voltage difference of the first and second base-emitter voltages in the respective first and second transistor stacks is developed across the first impedance element for providing at least a part of the first voltage level, and applying a second voltage level to a second end of the primary impedance element, the second voltage level being provided as a function of P of said N first base-emitter voltages, where P is an integer value greater than zero, the second voltage level being produced by a second circuit comprising a second op-amp configured to operate in a closed loop mode and co-operating with the first transistor stack for producing the P of said N first base-emitter voltages, the first and second voltage levels being applied to the respective first and second ends of the primary impedance element by the first and second circuits so that the voltage developed across the primary impedance element by the difference of the first and second voltage levels comprises said PTAT voltage.

52. A method for generating a bandgap voltage reference comprising the steps of:

providing a CTAT voltage from a CTAT voltage source, providing a PTAT voltage for summing with the CTAT voltage, the PTAT voltage being provided by applying a first voltage level to a first end of a primary impedance element, the first voltage level being provided as a function of the difference of N first base-emitter voltages and M second base-emitter voltages, N and M being integer values greater than zero and being of values different to each other, the first voltage level being produced by a first circuit comprising a first transistor stack having at least one first transistor for providing at least one of the N first base-emitter voltages, and a second transistor stack having at least one second transistor for providing at least one of the M second base-emitter voltages, each first transistor being operated at a first current density, and each second transistor being operated at a second current density, the second current density being different to the first current density, a first impedance element and a first op-amp configured to operate in a closed loop mode co-operating with the first and second transistor stacks so that a voltage difference of the first and second base-emitter voltages in the respective first and second transistor stacks is developed across the first impedance element for providing at least a part of the first voltage level, and applying a second voltage level to a second end of the primary impedance element, the second voltage level being provided as a function of P of said N first base-emitter voltages, where P is an integer value greater than zero, the second voltage level being produced by a second circuit comprising a second op-amp configured to operate in a closed loop mode and co-operating with the first transistor stack for producing the P of said N first base-emitter voltages, the first and second voltage levels being applied to the respective first and second ends of the primary impedance element by the first and second circuits so that the voltage developed across the primary impedance element by the difference of the first and second voltage levels comprises said PTAT voltage, and summing the PTAT voltage developed across the primary impedance element with the CTAT voltage.

* * * * *